(12) United States Patent
Fisher et al.

(10) Patent No.: US 9,880,814 B1
(45) Date of Patent: Jan. 30, 2018

(54) DYNAMIC GENERATION OF PLUGINS BASED ON USER-CUSTOMIZED CATALOGS

(71) Applicant: F5 Networks, Inc., Seattle, WA (US)

(72) Inventors: Stephen Alan Fisher, Kenmore, WA (US); Alain Joel Roy, Redmond, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 15/236,300

(22) Filed: Aug. 12, 2016

Related U.S. Application Data

(60) Provisional application No. 62/204,896, filed on Aug. 13, 2015.

(51) Int. Cl.
G06F 9/44 (2006.01)
G06F 9/445 (2006.01)
H04L 29/06 (2006.01)
H04L 29/08 (2006.01)

(52) U.S. Cl.
CPC .............. *G06F 8/30* (2013.01); *G06F 8/65* (2013.01); *H04L 67/16* (2013.01); *H04L 69/18* (2013.01)

(58) Field of Classification Search
None
See application file for complete search history.

(56) References Cited

U.S. PATENT DOCUMENTS

| | | | | |
|---|---|---|---|---|
| 7,047,518 B2 * | 5/2006 | Little | .................. | G06F 8/10 717/104 |
| 2010/0058327 A1 * | 3/2010 | Dehaan | .................. | G06F 8/61 717/176 |

OTHER PUBLICATIONS

Macvittie, Lori, "Device Packages: Integrating F5 Synthesis with Cisco APIC," https://devcentral.f5.com/articles/device-packages-integrating-f5-synthesis-with-cisco-apic, Updated May 19, 2014, 3 pages.

F5 Networks, Inc., "F5 BIG-IP Local Traffic Manager Service Insertion with Cisco Application Centric Infrastructure," Design Guide, http://www.cisco.com/c/dam/en/us/solutions/collateral/data-center-virtualization/application-centric-infrastructure/white-paper-c11-735490.pdf, Jul. 2015, 25 pages.

(Continued)

*Primary Examiner* — Chuck Kendall

(74) *Attorney, Agent, or Firm* — John W. Branch; Lowe Graham Jones PLLC

(57) ABSTRACT

Embodiments are directed towards dynamically generating a plugin module based on a customizable catalog. A plurality of application features may be determined based on a catalog of available application features of a visitor computer. One or more templates may be generated that lists application features. A plugin client and a corresponding plugin core that include application features listed in the one or more templates may be generated. The plugin client may then be provided to the host computer and the corresponding plugin core may be installed on the visitor computer. Information that may be associated with actions performed by users of the plugin client may be obtained from the host computer. Application features included in the plugin core may be determined based on the information obtained from the host computer. And, operations may be performed on the visitor computer based on the obtained information and the plugin core.

19 Claims, 12 Drawing Sheets

(56) References Cited

OTHER PUBLICATIONS

F5 Networks, Inc., "F5 Reference Architecture for Cisco ACI," https://f5.com/Portals/1/Cache/Pdfs/2421/f5-reference-architecture-for-cisco-aci.pdf, updated Nov. 18, 2015, 7 pages.
F5 Networks, Inc., "F5 iWorkflow: Cisco APIC Adminstration" https://suppotf5.com/kb/en-us/products/iworkflow/manuals/product/iworkflow-cisco-apic-administration-2-0-0,html?sr=56556503, Version 2.0, Published on Jul. 15, 2016, 48 pages.
F5 Networks, Inc., "Big-IQ Cloud: Cisco APIC Administration," https://support.f5.com/kb/en-us/products/big-iq-cloud-and-orchestration/manuals/product/bigiq-cloud-and-cisco-apic-administration-1-0-0.pdf?sr=56556503, Version 1.0 , Published on Feb. 4, 2016, 48 pages.
Roy, Alain, "Application Centric Configuration of F5 BIG-IP in Cisco ACI Using BIG-IQ," https://devcentral.f5.com/articles/application-centric-configuration-of-f5-big-ip-in-cisco-aci-using-bia-iq, Updated Jan. 23, 2015, 3 pages.

* cited by examiner

DYNAMIC GENERATION OF PLUGINS BASED ON USER-CUSTOMIZED CATALOGS

CROSS-REFERENCE TO RELATED APPLICATIONS

This application is a Utility patent application based on a previously filed U.S. Provisional Patent Application U.S. Ser. No. 62/204,896 filed on Aug. 13, 2015 entitled "DYNAMIC GENERATION OF PLUGINS BASED ON USER-CUSTOMIZED CATALOGS," the benefit of the filing date of which is hereby claimed under 35 U.S.C. § 119(e) and which is further incorporated by reference in its entirety.

TECHNICAL FIELD

The present invention relates generally to network management and, more particularly, but not exclusively to dynamically generating plugins to configure network devices.

BACKGROUND

The increasing use of Internet based services has led to a rapid increase in the number of communication connections between client computers and server computers. Traffic management devices such as load balancers, firewalls, switches, or the like, may often be used to manage and process network traffic and network connection between and among the client and server computers. In some applications there may be thousands or millions of client and server connections that need to be managed by network traffic management devices. Often, a client computer establishes a network connection with a server computer by using well-known network protocols, such as Transmission Control Protocol/Internet Protocol ("TCP/IP"), User Datagram Protocol ("UDP"), or the like. In some networks there may be more than one computer that may be managing the network. Administrators may be required to configure multiple network traffic management devices, routers, or other network manager device. This increased number of management devices may be increase the complexity of administration the networks. The traffic management devices are often configured based on policies of the network. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE INVENTION

Figure 1:
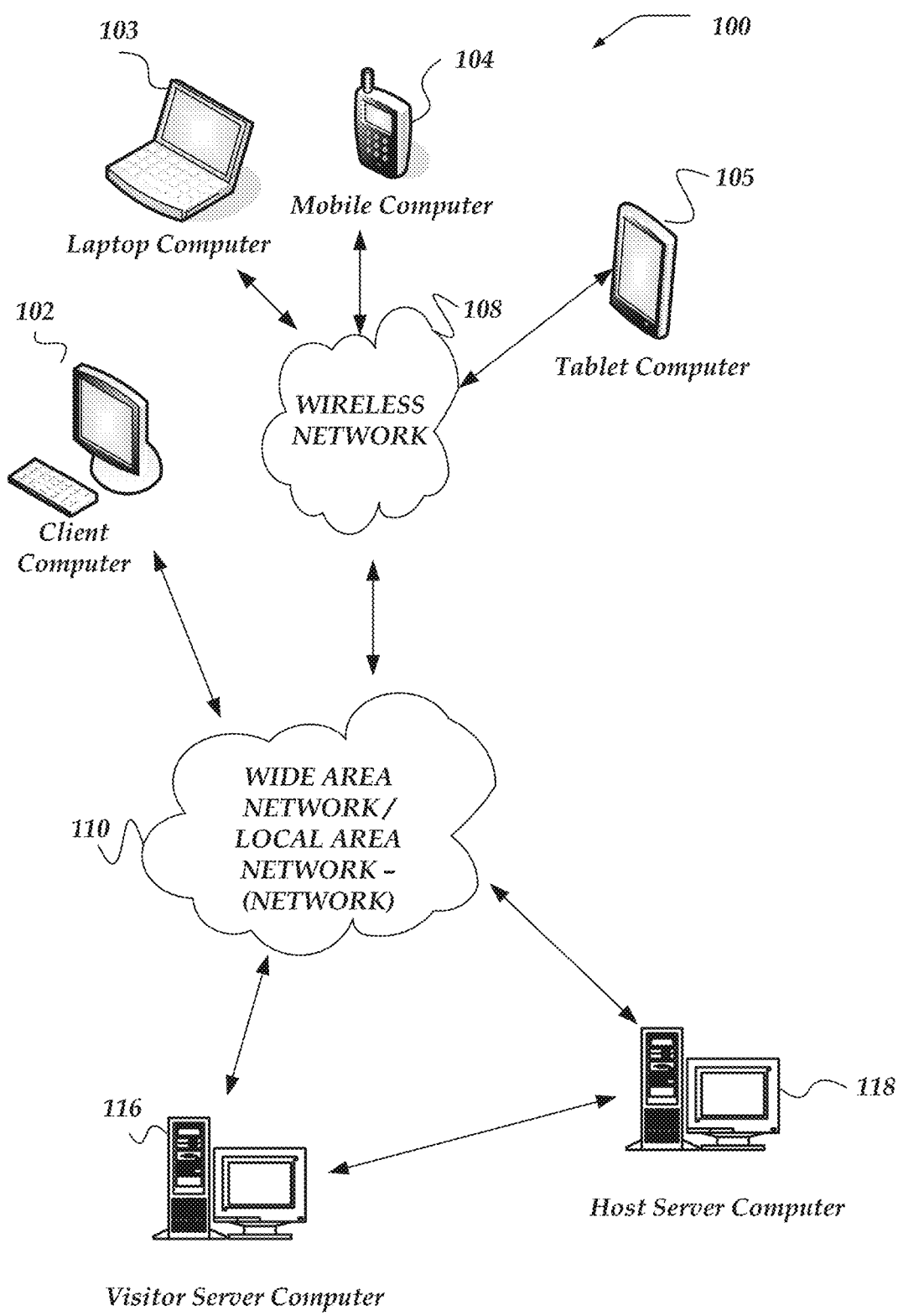
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a connection. In one embodiment, a 5 tuple may include a source Internet Protocol (IP) address, a destination IP address, a source port number, a destination port number, VLAN identifier, tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to a tuple comprising any combination of fields selected from within a network packet header, including those fields identified above.

As used herein, the terms "network flow," "connection flow,", "flow" refer to a network session that may be established between two endpoints. In at least one of the various embodiments, a tuple may describe the flow. In at least one of the various embodiments, flows may be useful if one or more of the endpoints of a network connection may be behind a traffic management computer, such as a firewall, switch, load balancer, or the like. In at least one of the various embodiments, such network flows may be used to ensure that the network packets sent between the endpoints of a flow may be routed appropriately. In at least one of the various embodiments, the performance of connection oriented network protocols such as TCP/IP may be impaired if network packets may be routed to unexpected endpoints.

As used herein, the term "application feature" refers to a feature of a computer or application that may be available for inclusion in a plugin. In some embodiments, application features, may be functions having names, parameter lists, return values, and in some cases side effects, that may be exportable using a plugin. In some embodiments, application features may be configuration values that may be settable using a plugin.

As used herein, the terms "configuration template" or "template" refer to a document, list, array, table, object, or other structured data that includes one or more application features, that may include configuration parameters associated with a visitor computer. Templates may be associated with one or more particular applications and/or services provided by a visitor computer. For instance, each application feature and/or configuration parameter included in a template may be associated web server services that may be provided by the visitor computer. The template may include one or more default values for each included application feature, a range of allowable values, permissions, tags, access levels or the like. In some embodiments, the application features listed in a template and/or their associated constraints/defaults may be generated based on a customized catalog of available application features. In some embodiments, templates may be defined using a markup language, such as Extensible Markup Language (XML) or the like.

As used herein, the term "visitor computer" refers to a computer that generates a plugin. As used herein, the term "host computer" refers to a computer that hosts a plugin that enables interactions and/or information exchanged to the visitor computer that provided the plugin.

As used herein, the term "catalog" refers to collection or list of one or more application features that may be available for including in templates and/or plugins. As used herein, the term "customized catalog" refers to a catalog of application features that has been customized to support and/or represent the application features that are associated with one or more particular purposes, applications, services, or the like.

As used here, the terms "plugin module," "plugin" or "device package" refer to a set of instructions that may be generated from a template. Plugins may include one or more application features, constraints, defaults, and so on that are defined in a template. The plugin may include instructions that enable the performance of actions on the machine hosting the application (e.g. host computer) as well as the actions on the computer the generated the plugin (e.g., the visitor computer). In at least one embodiment, plugins may comprise a plugin client that may be installed on the host computer and a plugin core that remains on the visitor computer. A plugin may be a shared library, dynamic-link library (DLL), Extensible Markup Language (XML), configuration file, or the like.

As used here, the terms "network controller" or "network management system" refer to an architecture, system, or platform that at least partially enables the management of network services. A network controller may be arranged to configure Layers 2-3 of the Open Systems Interconnection (OSI) model. However, without modification, a network controller may not be arranged to directly configure parameters and/or features associated with Layers 4-7 of the OSI model. In preferred embodiments, a network controller is located outside of the data plane of a network, although other embodiments are not so limited. The term "network controller computer" refers to a computer device that is hosting or includes a software/hardware component, module, application, or the like that includes features of a network controller.

Briefly stated, embodiments are directed towards dynamically generating a plugin module based on a customizable catalog. In at least one of the various embodiments, a plurality of application features may be determined based on a catalog of available application features of a visitor computer. In some embodiments, one or more the application features may be associated with one or more configuration parameters of visitor computer.

In at least one of the various embodiments, the one or more application features of the visitor computer may be arranged to perform configuration of configuration parameters that are associated with Open System Interconnect model (OSI) layers 4-7 of network traffic and/or network traffic management.

In at least one of the various embodiments, one or more templates may be generated that list one or more of the plurality of application features. In at least one of the various embodiments, the one or more application features listed in the one or more templates may be selected based on one or more applications of the visitor computer. For example, if the visitor computer provides services for configuring the management of web servers, a template may be defined that lists application features that may be associated with configuring the management of web servers.

In at least one of the various embodiments, generating the one or more templates may include, determining default parameter values, constraint values, permission levels, tags, or the like, for one or more or application features listed in the templates.

In at least one of the various embodiments, generating the one or more templates may include, determining one or more custom features that are listed in the one or more templates. In some embodiments, customer features may include, a script, a program, an interface to an external service, or the like.

In at least one of the various embodiments, generating the one or more templates, may also include determining feature group information that may be used to associate one or more listed application features together. In at least one of the various embodiments, the feature group information may include dependency information related to the associated listed application features.

In at least one of the various embodiments, a plugin client and a corresponding plugin core that include application features listed in the one or more templates may be generated. In at least one of the various embodiments, the plugin client may then be provided to the host computer and the corresponding plugin core may be installed on the visitor computer.

In at least one of the various embodiments, information that may be associated with one or more actions performed by one or more users of the plugin client may be obtained from the host computer.

In at least one of the various embodiments, the obtained information may be provided to the plugin core that corresponds to the plugin client. The relevant application features may be determined based on the information obtained from the host computer. And, in at least one of the various embodiments, operations may be performed on the visitor computer based on the obtained information and the application features that may be included in the plugin core. In at least one of the various embodiments, the performed operations may include configuring one or more configuration parameters of the visitor computer based on the obtained information.

In various embodiments, the host computer may be a third-party network controller. Once the plugin module is installed into the network controller, the functionality of the controller is updated or modified, such that an updated controller may implement the functionality and/or configuration of the visitor computer, based on and defined by the customization of the templates and/or plugin.

Accordingly, once a plugin is installed, the host computer may provide a streamlined workflow for configuring the visitor computer. A user of the host computer may be provided a simplified user-interface to collect information which may be employed to determine the parameters, default values, and editability status (and allowable ranges) of each of the parameters, for one or more of the application features included in the plugin. Accordingly, the interactions at the visitor computer may be streamlined and less prone to user-induced errors. The plugin enables the interactions with the visitor computer, such as, configuration, without exposing all of the application features and/or configuration parameters to the user.

When configuring the visitor computer, a user may be prompted for the visitor computer functionality (web server, mail server, traffic management server, and the like), as well as other sequential or cascading questions that are based on responses to previous questions or queries, via the host computer. The invoked parameters, default values, and editability of each of the parameters may be based on the answers provided to the queries. The host computer using the plugin may automatically access and configure the functionality of the visitor computer as provided by the plugin.

In at least one of the various embodiments, a catalog of application features may be determined by based on a visitor computer schema or application programming interface (API). In at least one of the various embodiments, one or more customized catalogs may be generated and used to generate one or more templates as described in more detail below. Application features may be determined based on the one or more templates.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visitor server computer 116, and host server computer 118.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, kiosk, point-of-sale, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, one or more other applications may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), media access control address (MAC address), an electronic serial number (ESN), operating system generated hardware identifier, or other device identifier. Such information may be provided in a network packet, or the like, sent between other client computers, visitor server computer 116, host server computer 118, or other computers.

Client computers 102-105 may further be configured to include a client application that enables an end-user to log into an end-user account that may be managed by another computer, such as visitor server computer 116, host server computer 118, or the like. Such an end-user account, in one non-limiting example, may be configured to enable the end-user to manage one or more online activities, including in one non-limiting example, search activities, social networking activities, browse various websites, communicate with other users, perform one or more financial activities, online banking, online investment management, or the like. However, participation in such online activities may also be performed without logging into the end-user account.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, cloud network, cloud instance, or the like.

Network 110 is configured to couple network computers with other computers, including, visitor server computer 116, and host server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of visitor server computer 116 is described in more detail below in conjunction with FIG. 3. Briefly, however, visitor server computer 116 includes virtually any network computer capable of generating dynamic plugins for use on a host computer, such as host server computer 118. Likewise, host server computer 118 includes virtually any network computer capable of obtaining and installing dynamic plugins for integration with a visitor computer, such as visitor server computer 116.

Although FIG. 1 illustrates visitor server computer 116, and host server computer 118 as single computers, the innovations and/or embodiments are not so limited. For example, one or more functions of visitor server computer 116, and host server computer 118 may be distributed across one or more distinct network computers. Moreover, visitor server computer 116, and host server computer 118 are not limited to a particular configuration. Thus, in one embodiment, visitor server computer 116 and/or host server computer 118 may be implemented using a plurality of network computers. In other embodiments, visitor server computer 116 and/or host server computer 118 may operate as a plurality of network computers within a cluster architecture, a peer-to-peer architecture, or the like. Further, in at least one of the various embodiments, one or more visitor server computers and/or host server computers may be implemented using one or more cloud instances in one or more cloud networks. Accordingly, these innovations and embodiments are not to be construed as being limited to a single environment, and other configurations, and architectures are also envisaged.

One embodiment of visitor server computer 116 and/or host server computer 118 may include virtually any network computers capable of managing network traffic between client computers 102-105 and server computers. Such computers include, for example, routers, proxies, firewalls, load balancers, cache devices, computers that perform network address translation (NAT), or the like, or any combination thereof. Visitor server computer 116 and/or host server computer 118 may perform the operations of routing, translating, switching packets, or the like. In one embodiment, visitor server computer 116 and/or host server computer 118 may inspect incoming network packets, and may perform an address translation, port translation, a packet sequence translation, and the like, and route the network packets based, at least in part, on the packet inspection. In some embodiments, visitor server computer 116 may perform load balancing operations to determine a server computer to direct a request. Such load balancing operations may be based on network traffic, network topology, capacity of a server, content requested, or a host of other traffic distribution mechanisms. In some embodiments, at least one of visitor device 116 or host server computer 118 is a network traffic management computer (TMC). In some embodiments, at least one at least one of visitor device 116 or host server computer 118 is a network edge computer device (NEC).

Illustrative Client Computer

Figure 2:
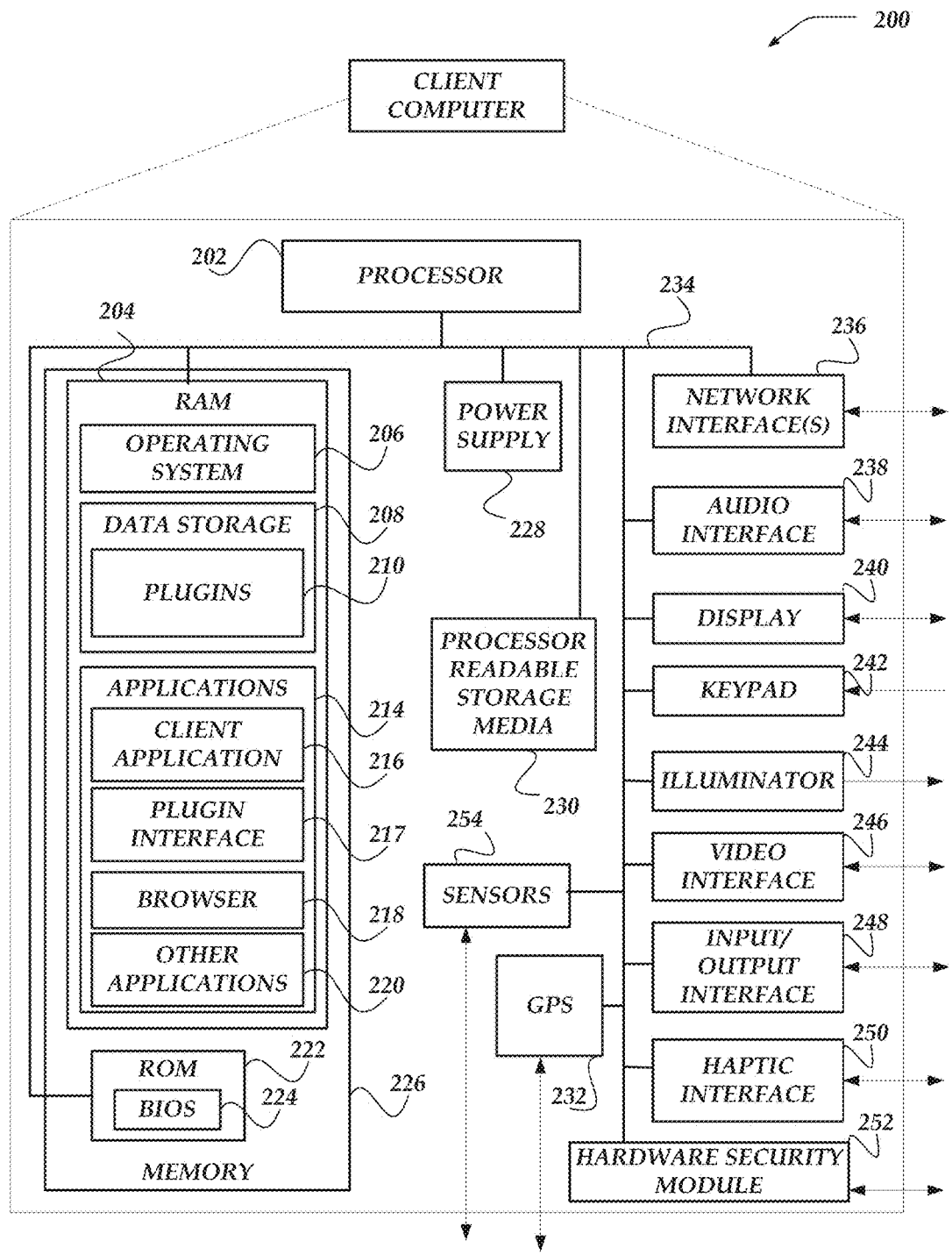
FIG. 2 shows an embodiment of a client computer that may be included in a system such as that shown in FIG. 1.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250. In some embodiments, a client computer may include components such as hardware security module 252, or a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Further, client computer 200 may also comprise hardware security module (HSM) 252 for providing additional safeguards for generating, storing and/or using security/cryptographic information such as, keys, digital certificates, passwords, passphrases, two-factor authentication information, cryptographic hashing, or the like. In some embodiments, hardware security module may be employed to support one or more standard public key infrastructures (PKI), and may be employed to generate, manage, and/or store public/private key pairs, or the like. In some embodiments, HSM 252 may be a stand-alone client computer, in other cases, HSM 252 may be arranged as a hardware card that may be added to a client computer. In some embodiments, HSM 252 may be arranged to provide hardware accelerated cryptography and/or compression of data.

Client computer 200 may also include sensors 254 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors 254 may be one or more hardware sensors that collect and/or measure data that is external to client computer 200.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system, or the like. The operating system may include, or interface with a Java virtual machine module, or the like, that enables control of hardware components and/or operating system operations via application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. Further, data storage 208 may be used for storing plugins 210 that may be employed for integrating with one or more network computers or other client computers.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitory, non-transitive, nonvolatile, removable, and non-removable media implemented in any method or technology for storage of information, such as computer or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, solid state drives (SSD), magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, client application 216, plugin interface 217, a browser 218, and other applications 220.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, HTML5, XML, and the like, to display and send a message. However, any of a variety of other web-based programming languages may be employed. In one embodiment, browser 218 may enable a user of client computer 200 to communicate with another network computer, such as visitor server computer 116 and/or host server computer 118 shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
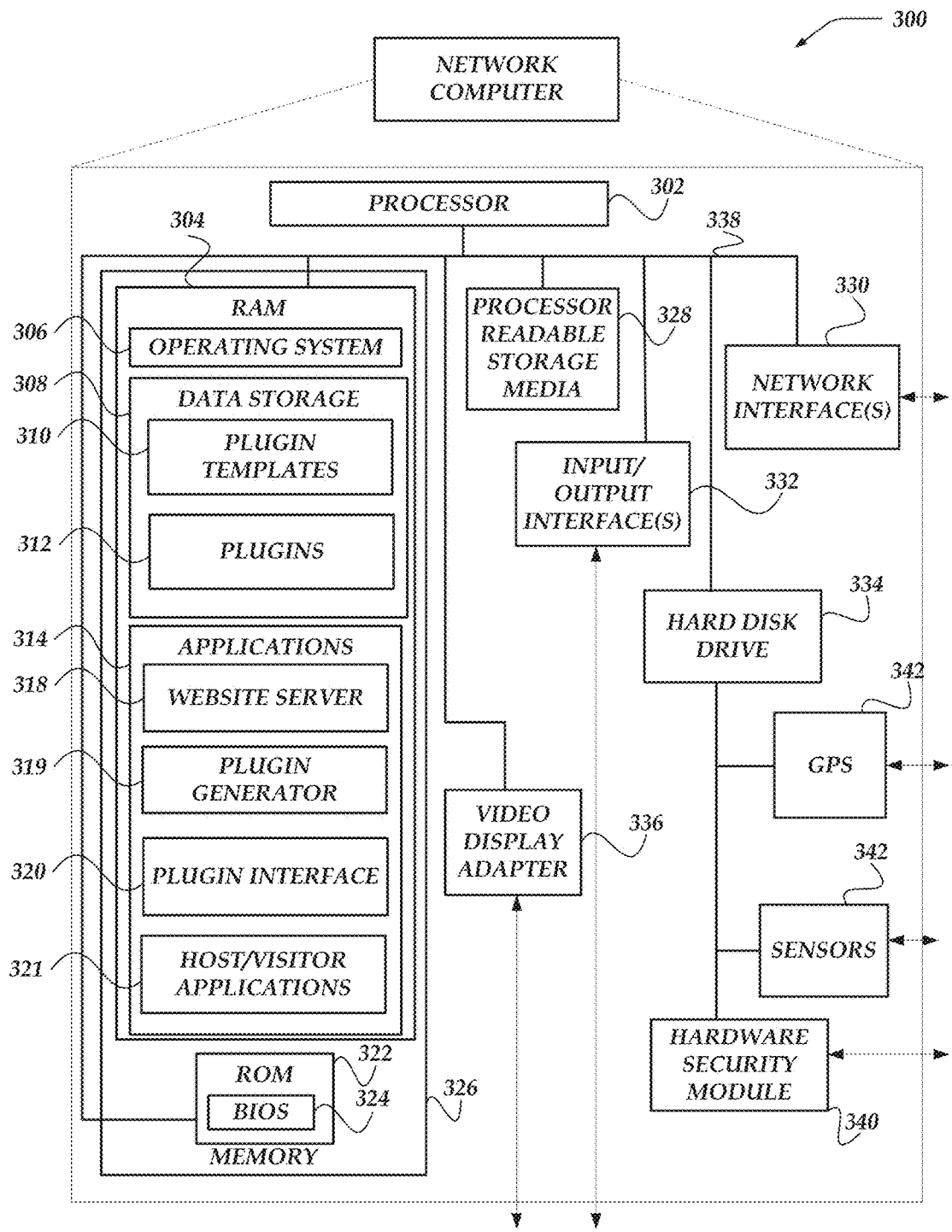
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example visitor server computer 116 and/or host server computer 118, and/or other network computers.

Network computer 300 may include processor 302, processor readable storage media 328, network interface unit 330, an input/output interface 332, hard disk drive 334, hardware security module 340, video display adapter 336, and memory 326, all in communication with each other via bus 338. In some embodiments, processor 302 may include one or more central processing units. In at least one of the various embodiments, network computer 300 may include global positioning system (GPS) receiver 342.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Network computer 300 may also include GPS transceiver 342 to determine the physical coordinates of network computer 300 on the surface of the Earth. GPS transceiver 342, in some embodiments, may be optional. GPS transceiver 342 typically outputs a location as latitude and longitude values. However, GPS transceiver 342 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 342 can determine a physical location within millimeters for network computer 300; and in other cases, the determined physical location may be less precise, such as within a meter or significantly greater distances. In one embodiment, however, network computer 300 may through other components, provide other information that may be employed to determine a physical location of the computer, including for example, a Media Access Control (MAC) address, IP address, or the like.

Further, network computer 300 may also comprise hardware security module (HSM) 340 for providing additional safeguards for generating, storing and/or using security/cryptographic information such as, keys, digital certificates, passwords, passphrases, two-factor authentication information, personal identification numbers, or the like. In some embodiments, hardware security module may be employed to support one or more standard public key infrastructures (PKI), and may be employed to generate, manage, and/or store keys pairs, or the like. In some embodiments, HSM 340 may be a stand-alone network computer, in other cases, HSM 340 may be arranged as a hardware card that may be added to a network computer. In some embodiments, HSM 252 may be arranged to provide hardware accelerated cryptography and/or compression of data.

Network computer 300 may also include sensors 342 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors 342 may be one or more hardware sensors that collect and/or measure data that is external to network computer 300.

Memory 326 generally includes RAM 304, ROM 322 and one or more permanent mass storage devices, such as hard disk drive 334, tape drives, solid state drives, optical drives, and/or floppy disk drives. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, thumb drives, memory cards, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may be used for storing plugin templates 310, and plugins 312 that may be employed for dynamic plugin creation, and/or integration with one or more network computers, or the like, or combination thereof.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, plugin generator 319, plugin interface 320, or one or more host/visitor server applications 321.

Website server 318 may represent any of a variety of information and services that are configured to provide content, including messages, over a network to another computer. Thus, web site server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, HTML5, XML, Compact HTML (cHTML), Extensible HTML (xHTML), or the like.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
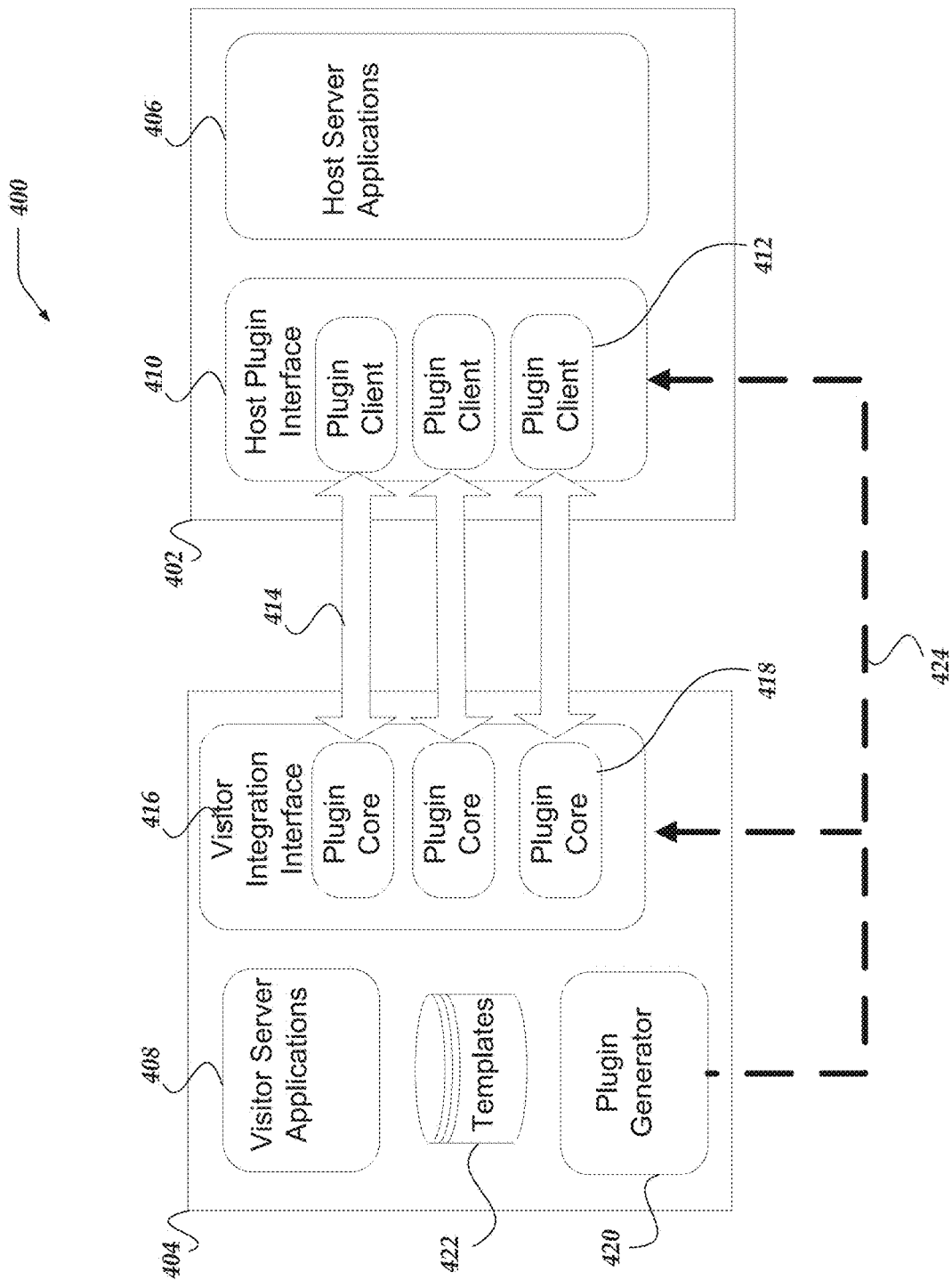
FIG. 4 illustrates a logical architecture of a system for generating and installing plugins based on user-customized configuration catalogs in accordance with at least one of the various embodiments.

FIG. 4 illustrates a logical architecture of system 400 for generating and installing plugins based on user-customized configuration catalogs in accordance with at least one of the various embodiments. In at least one of the various embodiments, system 400, includes a visitor computer, such as visitor computer 402. In at least one of the various embodiments, visitor computer 402 may be a visitor server computer, such as visitor server computer 116 of FIG. 1 or network computer 300 of FIG. 3. In at least one of the various embodiments, visitor computer 402 may be a component of a traffic management computer (TMC) or the like. Further, in at least one of the various embodiments, visitor computer 402 may represent one or more virtual machines and/or is operative in a cloud based environment. In some embodiments, visitor computer 402 may include a specialized hardware component, a specialized software component, or a combination thereof included or implemented in a TMC, or any other network computer. Accordingly, the visitor computer 402 may be a hardware and/or software module. In at least one of the various embodiments, visitor computer 402 may be a configurable system and is operative to dynamically generate plugins based on one or more user-customized templates.

In at least one of the various embodiments, system 400, includes a host computer, such as host computer 404. In at least one of the various embodiments, host computer 404 may be a host server computer, such as host server computer 118 of FIG. 1 or network computer 300 of FIG. 3. In at least one of the various embodiments, host computer 404 may be a component of a network edge device, such as, a router, network controller, or the like. Further, in at least one of the various embodiments, host computer 404 may represent one or more virtual machines and/or is operative in a cloud based environment. In some embodiments, host computer 404 may include a specialized hardware component, a specialized software component, or a combination thereof included or implemented in an device, or in any other network computer device. Accordingly, the host computer 404 may be a hardware and/or software module. In various embodiments, host computer 404 may be operative to execute a configuration management system or a network controller. Visitor computer 402 and host computer 404 may be communicatively coupled via a communication network, such as network 110 of FIG. 1.

In at least one of the various embodiments, visitor computer 404 may be arranged to include one or more visitor server applications 408, templates 422, visitor integration interface 416, one or more plugin cores 418, or the like. In at least one of the various embodiments, templates 422 may be arranged to represent one or more features and/or configurations associated with visitor server applications 408. In at least one of the various embodiments, plugin generator 420 may be arranged to generate plugins that may be based on a template. In at least one embodiment, such as system 1200 of FIG. 12, the plugin generator 420 is included in a separate computer from the one that includes the visitor integration interface 416. For instance, the visitor integration interface may be included in a computer of the data plane and the plugin generator may be included in a computer of a management plane.

In at least one of the various embodiments, core portions of a plugin, such as, plugin core 418 may be arranged to be included in an interface component, such as, visitor integration interface 416. In at least one of the various embodiments, plugin cores 118, represent functionality associated with the plugins that may be executed on the visitor computer rather than on the host computer.

In at least one of the various embodiments, host computer 402, represents a computer that may enable one or more plugins from one or more visitor computer, such as, visitor computer 404 to be installed. In at least one of the various embodiments, host computer 402 may include one or more host server applications 406, host plugin interface component 410, plugin clients 412, or the like. In at least one of the various embodiments, plugin clients 412 may be portions of a plugin that are required to be installed and executed on host computer 402.

In at least one of the various embodiments, plugin clients 412 may be arranged to communicate with their corresponding plugin servers over communication path 414. In at least one of the various embodiments, communication path 414 may represent a wired or wireless network connection between host computer 402 and visitor computer 404. In some embodiments, communication path 414 may be path between separate network computers and/or separate processes on the same network computer. In at least one of the various embodiments, the particular protocol used to communicate over communication path 414 may vary depending on one or more applications running on at least one of visitor computer 404 or host computer 402.

In at least one of the various embodiments, plugin clients 412 may be provided to host computer 402, as schematically represented by communication path 424. In at least one of the various embodiments, plugins may be provided via a push, a pull, download, upload, or any other such mechanism for providing a plugin, via a communication network.

In at least one of the various embodiments, host computer 402 may be a network configuration management system or a network controller. Also, in at least one of the various embodiments, visitor computer 404 may be a traffic management computer, application delivery controller, or the like, that may be arranged to enforce one or more network management policies. In at least one of the various embodiments, host computer 402 may be arranged to establish and enforce network management policies at OSI layer 3 and below (Layers 1-3). And, in at least one of the various embodiments, visitor computer 404 may be a TMC that may be arranged to enforce network management policies at OSI layer 4 and above (Layers 4-7).

Accordingly, in at least one of the various embodiments, plugin clients 412 and plugin cores 418 may be arranged to enable host computer 402 to configure or otherwise interface with the OSI Layers 4-7 management capabilities of visitor computer 404.

In at least one of the various embodiments, plugin clients 412 may be arranged to provide user interfaces that enable users to configure and/or interact with one or more application features of visitor computer 404.

Figure 5:
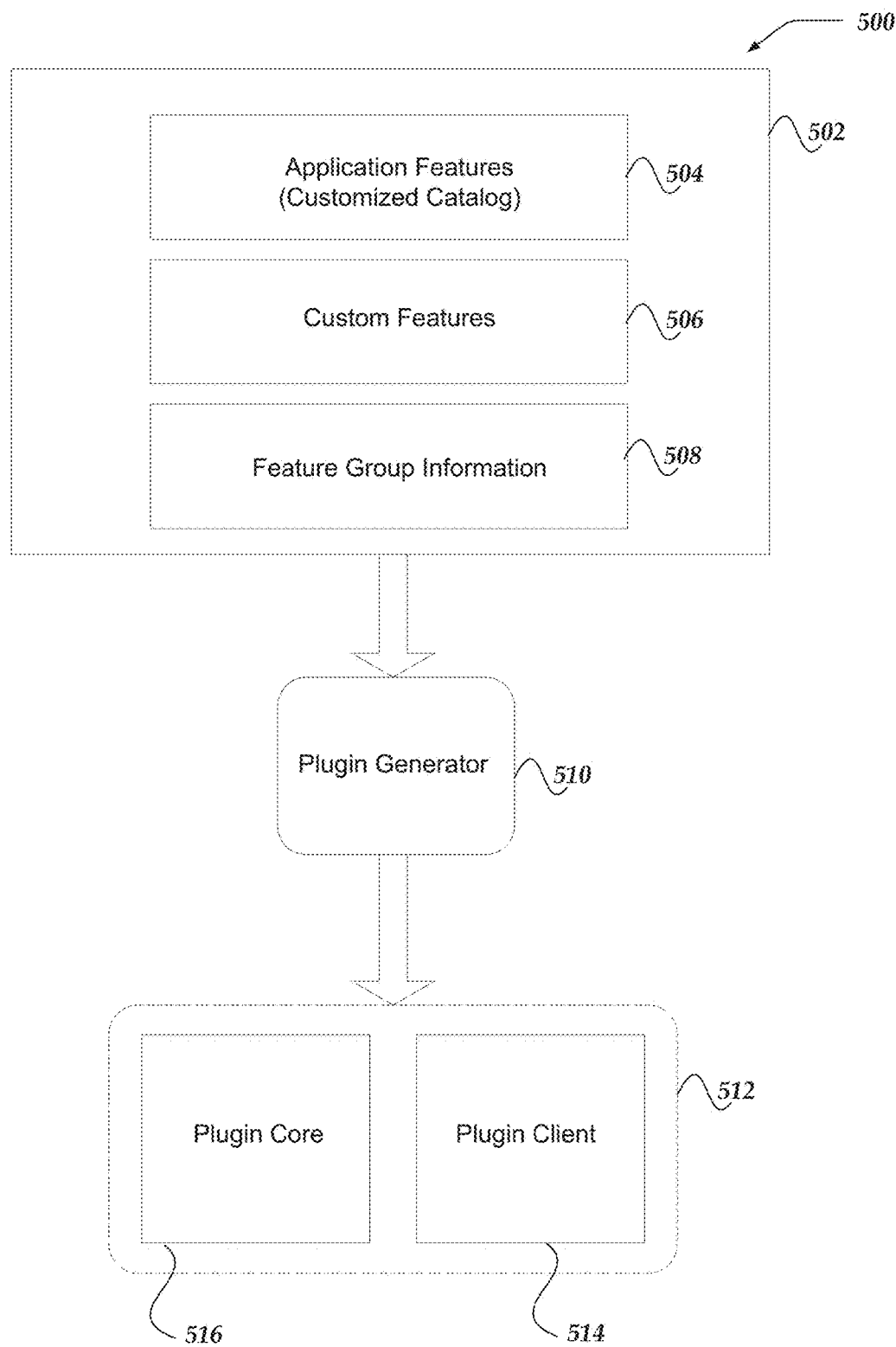
FIG. 5 shows a logical architecture of a system for generating plugins from template information in accordance with at least one the various embodiments.

FIG. 5 shows a logical architecture system 500 for generating plugins from template information in accordance with at least one the various embodiments. In at least one of the various embodiments, a user may be enabled to generate one or more templates, such as, template 502 that may be used for generating plugins that may be deployed on host computers. In at least one of the various embodiments, templates may be arranged to define the application features, constraints, dependencies, defaults, or the like, for a given plugin.

One or more templates, such as, template 502 may be generated based on a catalog that includes the application features that may be available on a visitor computer, such as visitor computer 404 of FIG. 4. For example, if the visitor computer is a traffic management computer, the universe of features may include configuration functions, reporting functions, traffic management functions, or the like, that may be associated with network traffic management.

In at least one of the various embodiments, template 502 may include one or more sets of application features, such as, application features 504. In some embodiments, these application features 504 may be determined based on one or more customized catalogs (not-shown). Or, in at least one of the various embodiments, application features 504 may be determined using a customized catalog of application features selected from the full catalog of application features for the visitor computer. In at least one of the various embodiments, application features 504 may be implemented using one or more data structures such as lists, arrays, tables, or the like. In some embodiments, the data structures, may include signature data related to each application feature, such as, name, id, parameter lists, return value type, module name, library dependencies, or the like. The signature data may vary depending on the application, however, application features 504 may include sufficient signature data to enable the feature to be identified and executed with the proper parameters.

Also, in at least one of the various embodiments, application features 504 may include additional meta-data for each feature, such as, constraints, default parameter values, dependencies, access level/permissions, one or more tags, or the like, or combination thereof. In some embodiments, tags may be included to provide context to further support integration with external systems (e.g., host computers).

In at least one of the various embodiments, template 502 may include one or more custom features, such as, custom features 506. In some embodiments, custom features may represent one or more functions and/or features that may not be included in the catalog of application features. In some embodiments, custom features 506 may be features and/or functionality implemented using custom programming, scripting, or the like. Also, in at least one of the various embodiments, custom features 506 may include features provided by integrating with other services, applications, or the like. Similar, to application features 504, custom feature 506 may be arranged to include sufficient information for identifying and execute the underlying components/services that perform the actions associated with a given custom feature. In some embodiments, a custom feature may bundle scripts, programs, or the like, that perform the actions. Also, in some embodiments, custom features 506 may include meta-data that may be information that may be used to locate and execute remote scripts/code/programs to perform the actions. Further, in at least one of the various embodiments, customer features 506 may be implemented using data structures and signature data as described for application features 504.

In at least one of the various embodiments, template 502 may also include feature grouping information, such as, feature group information 508. Process 800 of FIG. 8 describes an exemplary embodiment for determining feature group information. In some embodiments, feature group information 508 may include data used to group two or more features together in a group. In some cases, feature groups may be arranged to organize features into groups based on feature types. In other cases, feature groups may be arranged to organize features based on the services the grouped features may be associated with. For example, in at least one of the various embodiments, a template that may be designed to generate a web server integration plugins may include a feature group that comprises features associated with configuration of the network address information such as, external IP addresses, internal IP addresses, or the like. Likewise, in this example, the same template, may include another feature group that collects application features relates to security setting for the web server, such as, cryptographic certificate information, firewall rules, or the like.

In at least one of the various embodiments, feature group information 508 may also define relationship information between/among one or more application features. In some embodiments, such relationships may include dependency relationships, cascading effects, or the like. Also, in at least one of the various embodiments, feature group information may define one or more fields that may be used to collect data that may be disseminated to other application feature in the same group. For example, a feature group may define a field such as IP address that one or more other application features may depend on. Accordingly, in this example, if the IP address field is set (via of a plugin made from the template) the other application features in the group may be set accordingly.

In at least one of the various embodiments, template 502 may be arranged to define which of the application features, custom features, or feature groups, may be exposed to users on the host computer. In some embodiments, one or more features may be hidden from view and/or one or more feature may be exposed. Accordingly, complexity related to the integration of the visitor computer and the host computer may be reduced and/or hidden by plugins generated from the template.

In at least one of the various embodiments, if a template has been configured/generated, it may be compiled into a plugin using a plugin generator, such as, plugin generator 510. Plugin generator 510 may be included in one or more applications, such as, but not limited to, plugin generator 319 of FIG. 3. In at least one of the various embodiments, plugin generator 510 may be arranged to accept a template and compile a plugin that may be compatible with one or more visitor computers. In some embodiments, different visitor computers may require different plugin interface, or the like, so the plugin generator may be arranged to create plugins that are appropriate for a given visitor computer.

In at least one of the various embodiments, plugin 512 represents a plugin that was generated by plugin generator 510. As described above, plugin 512 may comprise two main parts, plugin client 514 and plugin core 516. In at least one of the various embodiments, plugin client 514 may be the portion of the plugin that may be installed on a host computer, such as host computer 402 of FIG. 4. Whereas, plugin core 516 represents the portion of the plugin that may perform actions on the visitor computer in response to interactions with the plugin client that occur on the host computer. For example, a plugin may be arranged to collect configuration information entered on the host computer that may be used to configure the visitor computer. In this example, the plugin client may be accessed on the host computer to collect configuration information. However, its correspondent plugin core executing on the visitor computer may be arranged to perform the actions to apply the configuration information on the visitor computer.

In at least one of the various embodiments, plugins, such as, plugin 512 may be provided to a host computer automatically over a network. Or, in some embodiments, users may be enabled to install plugins on host computers manually.

Generalized Operations

The operation of certain aspects of the invention will now be described with respect to FIGS. 6-10. In at least one of various embodiments, processes 600, 700, 800, 900, and 1000 described in conjunction with FIGS. 6-10, respectively, may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more client computers, such as client computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, client computer, cloud computer, or the like, may be utilized.

Figure 6:
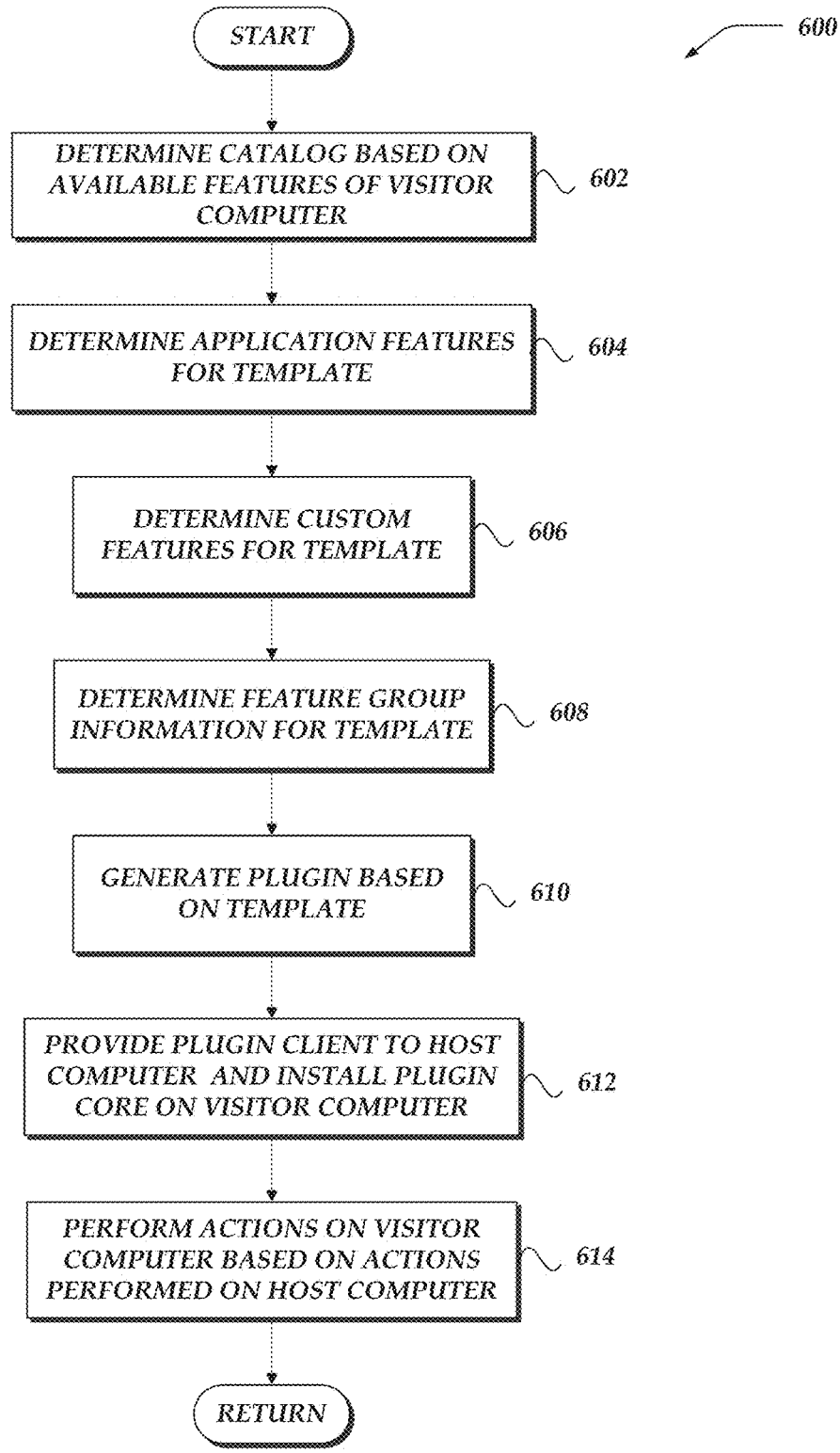
FIG. 6 shows an overview flowchart for a process to generate plugins for configuring a visitor computer in accordance with at least one of the various embodiments.

FIG. 6 shows an overview flowchart for process 600 to generate plugins for configuring a visitor computer, such as visitor computer 404 of FIG. 4, in accordance with at least one of the various embodiments. After a start block, at block 602, in at least one of the various embodiments, a catalog of application features may be determined based on the available application features of a visitor computer. In at least one of the various embodiments, a catalog of application features may be determined by based on a visitor computer schema or application programming interface (API).

At block 604, in at least one of the various embodiments, one or more application features may be determined for one or more templates, for instance template 502 of FIG. 5. In at least one of the various embodiments, as described above, applications features for one or more templates may be determined based on a customized catalog. In other embodiments, the application features may be selected and listed in the template. Application features may include configuration values for a visitor computer. Application features may include application features 504 of FIG. 5.

At block 606, in at least one of the various embodiments, one or more custom features for the one or more templates may be determined (if any). Custom features may include custom features 506 of FIG. 5. In some embodiments, an application such as, plugin generator 319 of FIG. 3 or plugin generator 510 of FIG. 5, may be arranged to generate a user-interface that enables a user to select scripts, programs, or the like, to include as a custom feature. In other embodiments, the user interface may enable a user to enter custom program code into the one or more templates.

At block 608, in at least one of the various embodiments, feature group information for the one or more templates may be determined. In at least one of the various embodiments, as described above, feature group information, such as feature group information 508 of FIG. 5, may associate two or more application features into one or more groups. In some embodiments, feature group information may include dependency information of various application features in the groups. Also, in at least one of the various embodiments, feature group information may include defining one or more fields that may be used for collecting information that may be used with one or more application features in the group.

At block 610, in at least one of the various embodiments, a plugin may be generated based on the one or more templates. In some embodiments, the plugin may be generated by a computer that is outside of the data plane. For instance, the plugin may be generated by a computer in a network management plane. As described above, the plugin may be compiled to enable particular host computers (and/or host applications) to access the application features lists in the one or more templates. In at least one embodiment, the plugin generator generates the plugin.

At block 612, in at least one of the various embodiments, plugins may have two parts, a public client, such as plugin client 514 of FIG. 5, which may be installed on the host computer, and a plugin core, such as plugin core 516 of FIG. 5, which may be installed on the visitor computer. In at least one embodiment, the plugin in generated by a computer that is separate from the visitor computer. For instance, the plugin may be generated by a computer that is within a network management plane and the plugin core is provided to the visitor plane. In at least one of the various embodiments, the plugin client collects information provided by users of the host computer and provides it to the plugin core that may be installed on the visitor computer. Accordingly, this visitor computer will perform the actions for one or more application features depending on the information that may be provided by its plugin client.

In at least one of the various embodiments, the plugin client may be automatically installed on the host computer. In other embodiments, a user may manually install the plugin client on the host computer. In various embodiments, the plugin core is automatically installed on the visitor computer, while in other embodiments, a user manually installs the plugin core on the visitor computer.

At block 614, in at least one of the various embodiments, actions may be performed on the visitor computer based on interactions of a user of the host computer with the plugin client. For example, the plugin client may enable users of the host computer to configure one or more parameters of the visitor computer. Likewise, the visitor computer may communicate information via the plugin core, over communication pathway 414 of FIG. 4, to the plugin client for display to the user of the host computer. For example, the plugin client on the host computer may enable users to configure OSI Layers 4-7 configuration parameters on the visitor computer. Similarly, the plugin client may obtain information from the visitor computer for display on the host computer. Next, control may be returned to a calling process.

Figure 7:
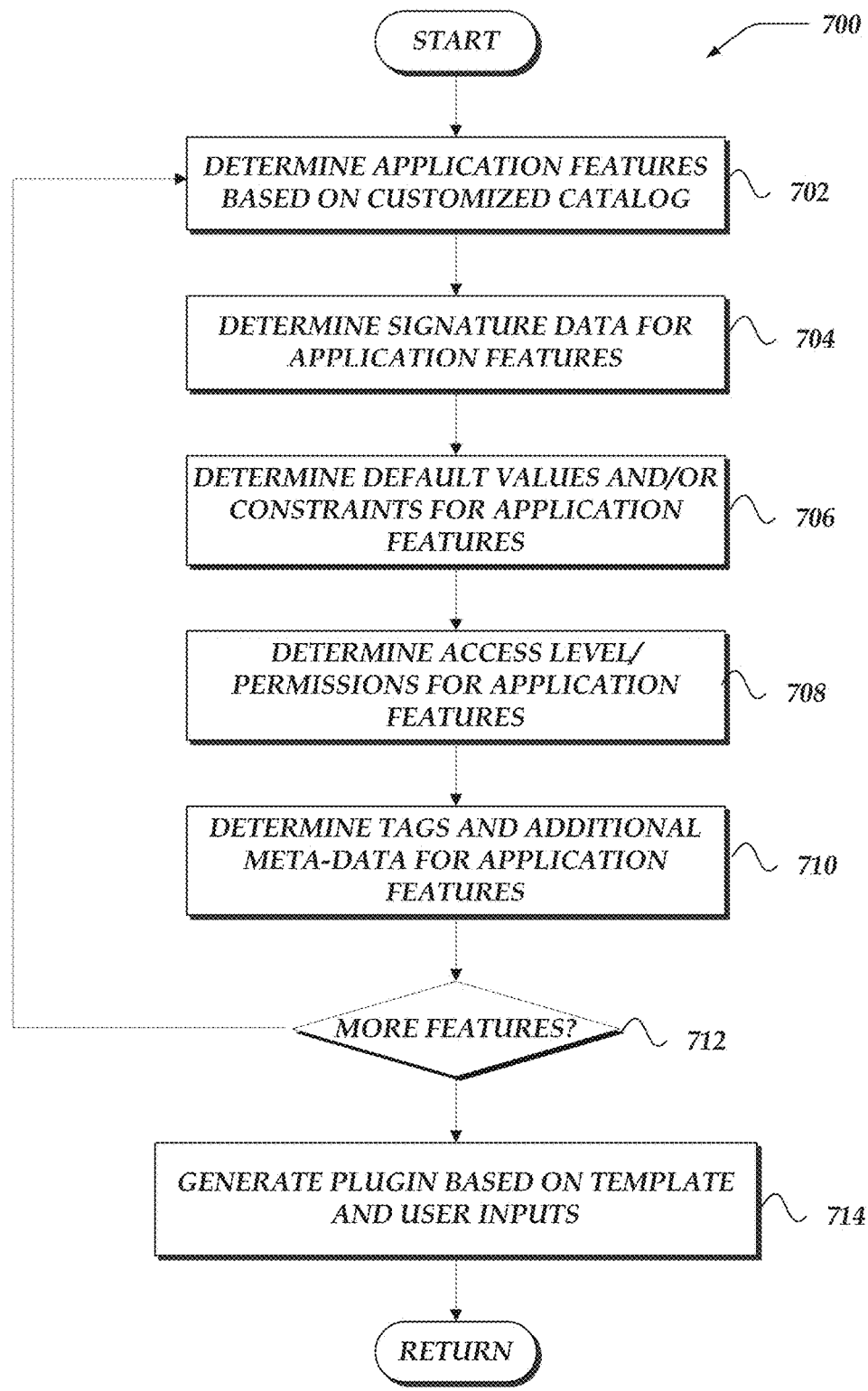
FIG. 7 shows an overview flowchart for a process to list application features in a template in accordance with at least one of the various embodiments.

FIG. 7 shows an overview flowchart for process 700 to list application features, such as application features 504 of FIG. 5, in a template, such as template 502, in accordance with at least one of the various embodiments. After a start block, at block 702, in at least one of the various embodiments, the list of application features for the one or more templates may be determined based on customized application feature catalog for the visitor computer.

In at least one of the various embodiments, the application features may be determined based on taking a snapshot of the current configuration of the visitor computer and/or one or more visitor computer applications. Accordingly, the list of application features (e.g., configuration parameters in this case) may be determined from the snapshot. In this way, one or more templates may be determined for a currently configured visitor computer. Accordingly, a plugin that configures other visitor computers with a similar configuration to the currently configured computer may be generated.

At block 704, in at least one of the various embodiments, signature data for the application features may be determined. In at least one of the various embodiments, signature data may be the name, id, parameter list, return value types, or the like, that may be associated with a particular application feature. The signature data may enable a plugin to correctly determine which native application feature of visitor computer to invoke. In some embodiments, a hash value may be generated based on one or more fields of the signature data. The hash value may be used to as an index to identity and/or retrieve a particular application feature when a plugin is try to invoke it.

At block 706, in at least one of the various embodiments, one or more default parameter values, parameter value constraints, or the like, may be determined for the configuration parameters for the application features. In at least one embodiment, the default parameter values, parameter value constraints, and the like may be determined for the configuration parameters associated with, or included within the application features. In at least one of the various embodiments, the one or more templates may define these values for one or more of its lists of application features. In some embodiments, a user may be enabled to modify the constraints that may be defined in the one or more templates. For example, the templates may include an application feature that defines a default gateway value (e.g., an IP address or host name) for a network application. Accordingly, in this example, assuming that the user has the correct access level, the user may choose to accept the default gateway value as defined in the template or she may override it and set a different value for the gateway.

In at least one of the various embodiments, constraints for parameters may include data types, such as, integer, floating points, strings, dates, timestamps, IPv4 address, IPv6 address information, or the like. In at least one of the various embodiments, constraints may also include ranges of value, such as, [10-20], A-Z, and so on. In some cases, the constraints may be defined using regular expression or other pattern definitions. In at least one embodiment, constraints may include a list if discreet allowable values for a parameter. For instance, a particular parameter may be configurable in a finite number of states, each indicated in a list. Such states may include load balancing modes or methods, such as round-robin, least connections, and the like. At block 708, one or more access levels, permissions, and the like are determined for the application features.

At block 710, in at least one of the various embodiments, there may be one or more tags and additional meta-data that may be need to be associated with the application features. In some cases, the tags and/or meta-data may be defined in the one or more templates. In some other embodiments, the tags and/or meta-data may be added by a user having the proper access level. In at least one of the various embodiments, tags may be used by host computer to determine how to display a given application feature. Also, tags may enable searching, and sorting of application features based their associated tags At decision block 712, in at least one of the various embodiments, if more application features need to be processed, control may loop back to block 702; otherwise, control may flow to block 714.

At block 714, in at least one of the various embodiments, a plugin may be generated based on the one or more templates and any additional modifications (not included in the template) that may be made by the user. In at least one of the various embodiments, the plugin may be generated by compiling the information included in the template with additional information that may have been provided by the user into a plugin client and a corresponding plugin core. Next, control may be returned to a calling process.

Figure 8:
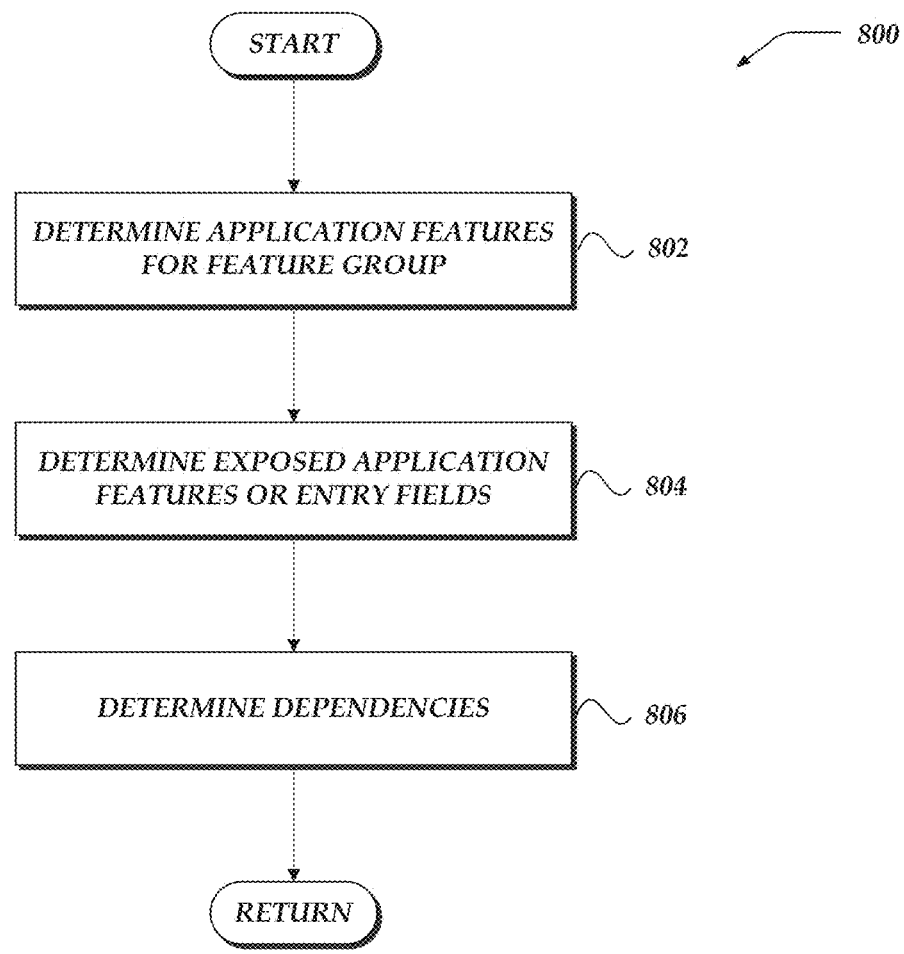
FIG. 8 shows an overview flowchart for a process to determining feature group information in accordance with at least one of the various embodiments.

FIG. 8 shows an overview flowchart for process 800 to determining feature group information, such as feature group information 508 of FIG. 5, in accordance with at least one of the various embodiments. A described above feature group information, such as feature group information 508 of FIG. 5, is the information that describes how two or more application features, included in application features such as application features 504 of FIG. 5, may be grouped together. It also enables "phony" entry fields to be created that collect information that is then used with the application features in the group. Here the entry field is referred to as phony since it may not correspond to any particular application feature.

After a start block, at block 802, in at least one of the various embodiments, application features that are assigned to a group may be determined. In at least one of the various embodiments, during the creation of a template, a user may select two or more related application features and group them. In at least one of the various embodiments, the application features in a group each have individually defined constraints, defaults, permissions, or the like.

For example, if the host computer is a traffic management computer it may offer an application for configuring network policies for Domain Name Servers. Accordingly, in some embodiments, some or all of the application features related to configuring a DNS may be associated into a group.

At block 804, in at least one of the various embodiments, one or more application features may be determined to be exposed application features. Also, one or more phony entry fields may be defined as well. In at least one of the various embodiments, exposed application features refer to application features that may be exposed/visible on to the users of the plugin client. In many cases, there may one or more application features hidden from the view of the users of plugin clients. Likewise, there may be one or more application features configured to be visible to the users of plugin clients.

In at least one of the various embodiments, phony entry fields may be fields that are visible to users of plugin client but they may not correspond to a particular application. Phony entry fields in the template may be result in user-interface elements that are visible to users of plugin clients. For example, if multiple application features in a feature group require an IP address value to be provided by a user of the plugin client, a phony entry field may be arranged to collect the IP address value and provide to the multiple application features in the group that require it.

In at least one of the various embodiments, one or more application features in the feature group may be have various dependencies. At block 806, these dependencies are determined. In some cases, setting one particular parameter value for one application feature may require other application features to have parameters set to particular values. Accordingly, in at least one of the various embodiments, this type of dependency information may be included as part of the feature group information. Also, in some cases, the results of executing one application feature may be required to be provided to another application feature. In at least one of the various embodiments, dependency chains, and/or dependency rules for application features in a feature group may be defined using rule-based methods, such as, scripting, conditionals, branching, or the like. In some cases, computer languages, such as TCL, Lua, C, Perl, Ruby, Python, Java, Javascript, or the like, may be employed to define the dependencies among the application features in the feature group.

In at least one of the various embodiments, feature groups in a template/plugin may be nested. Accordingly, in some embodiments, the entire template may be considered a feature group that includes one or more sub-feature groups. Also, feature groups may be associated with tags or other meta-data that may provide useful context information the host computer. For example, if a host computer is a network controller that sorts plugin features based on whether they are security features, application features, backend features, front-end features, and so on, the appropriate tag information (or other meta-data) may be associated with a feature group as required. Next, control may be returned to a calling process.

Figure 9:
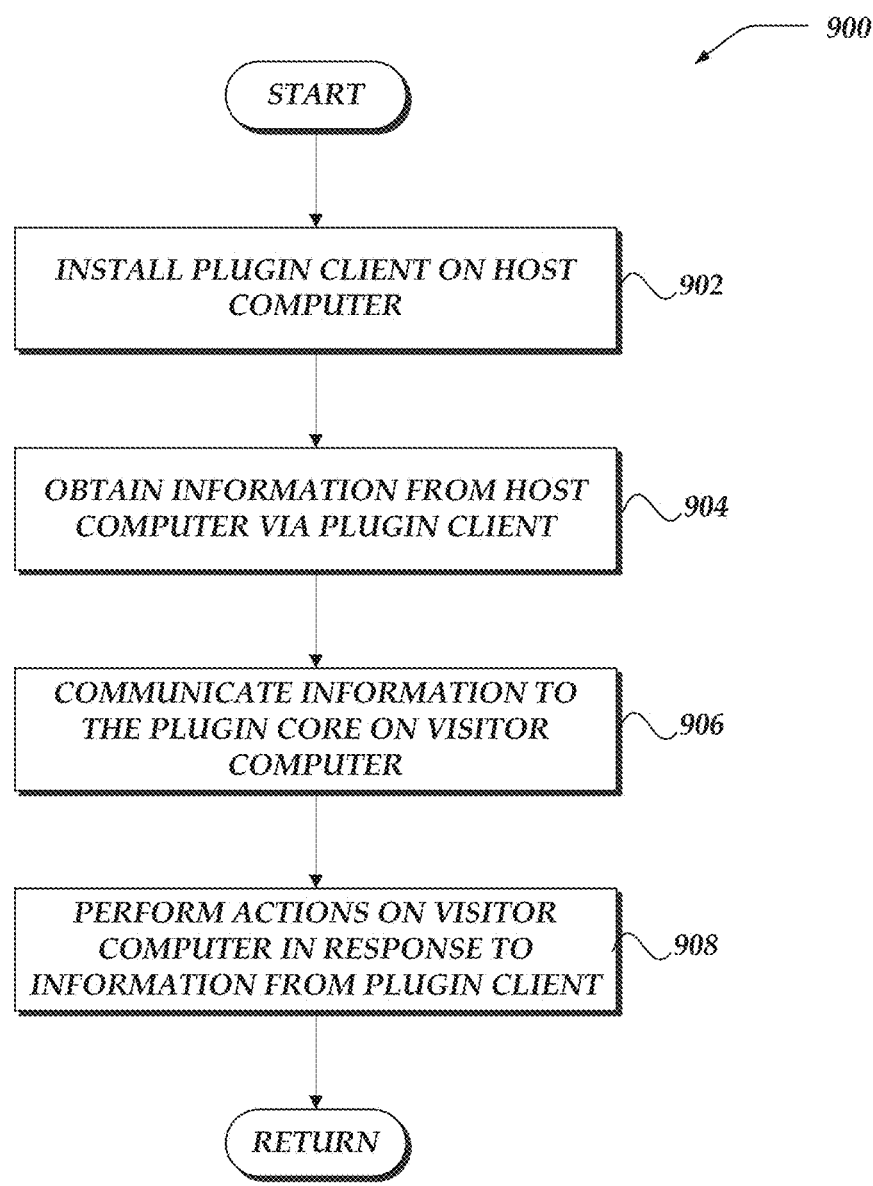
FIG. 9 shows an overview flowchart for a process for installing and using plugins in accordance with at least one of the various embodiments.

FIG. 9 shows an overview flowchart for process 900 for installing and using plugins in accordance with at least one of the various embodiments. After a start block, at block 902, in at least one of the various embodiments, the plugin client, such as plugin client 514 of FIG. 5, for a plugin, such as plugin 512 of FIG. 5, may be installed on a host computer, such as host computer 402 of FIG. 4. As described above, a given host computer and/or host computer's application may provide facilities for installing and interacting with plugins provided by visitor computer. In at least one of the various embodiments, the portion of a plugin that is installed on a host computer may be referred to a plugin client. The portion of a plugin that is installed on a visitor computer, such as visitor computer 404 of FIG. 4, may be referred to as a plugin core. The plugin core may include plugin core 516 of FIG. 5.

At block 904, in at least one of the various embodiments, information may be obtained from the host computer via the plugin client. In at least one of the various embodiments, the plugin client may enable the host computer to provide a user interface to its users that enable them to enter information via plugin client running on the host computer.

In at least one of the various embodiments, the user interface for a plugin client running on a host computer may include one or more user interface elements (entry fields, select lists, check boxes, radio button groups, or the like) the correspond to exposed application features and/or phony entry fields that were defined in a template, such as template 502 of FIG. 5, and then compiled into the plugin client and the corresponding plugin core.

In at least one of the various embodiments, the plugin client may include processing that may be performed on the host computer. In other embodiments, the plugin client may be arranged to act in a pass through capacity where user interactions/entries are simply collected.

At block 906, in at least one of the various embodiments, the information collected at the plugin client may be communicated to the plugin core that is on the visitor computer, via a communication path, such as communication path 414 of FIG. 4. In at least one of the various embodiments, the plugin client and plugin core may be arranged to communicate over a network, such as network 110 of FIG. 1. For example, if the visitor computer and host computer are separate machines. In some embodiments, a visitor application and a host application may be operating on the same computer rather than each being a separate computer. In such cases, the information collected at the plugin client may be communicate via one or more forms of inter-process communication rather than over a network.

At block 908, in at least one of the various embodiments, one or more actions on the visitor computer may be performed in response to the information provided by the plugin client. In at least one of the various embodiments, the plugin core that corresponds to the plugin client may be arranged to accept the provided information, lookup the appropriate application features, marshal the provided values and parameters, and execute the application feature natively on the visitor computer. For example, the plugin core may determine a particular application feature based on signature data, such as the signature data determined at block 704 of FIG. 7, provided with the information communicated by the plugin client. In some embodiments, it may look up a function pointer that corresponds to the application feature and executed with the parameter information that may be provided by the plugin client.

In at least one of the various embodiments, the information provided by the plugin client may correspond to a feature group. Accordingly, the plugin core may look up the feature group and execute any dependency rules that may be defined for the application features in the feature group. Likewise, if the plugin client provides a phony entry field for a feature group, the plugin core may look up the corresponding feature group and apply the phony entry field to its application features according to the dependency rules for in the feature group. Next, control may be returned to a calling process.

Figure 10:
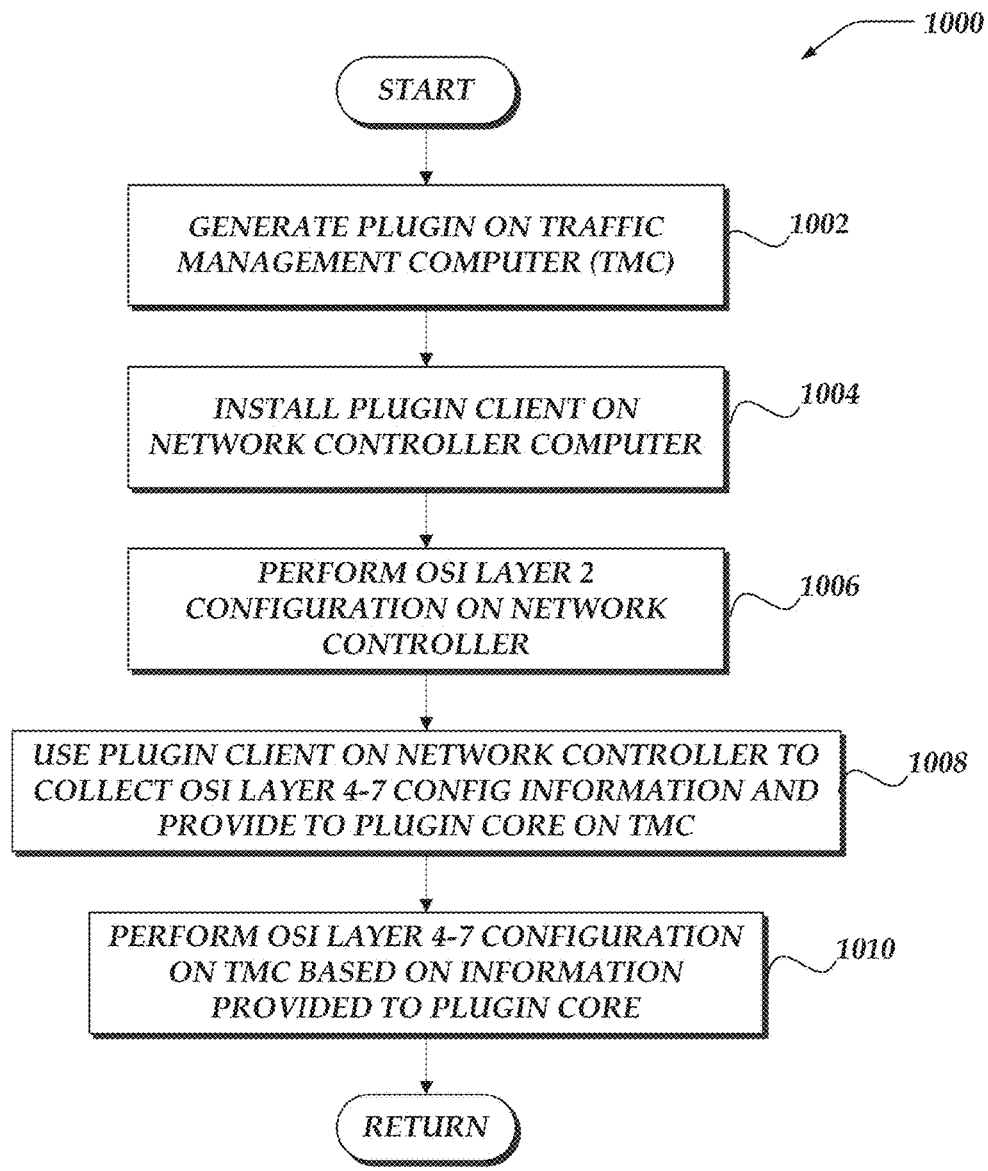
FIG. 10 shows an overview flowchart for a process for using plugins for configuring OSI Layer 4-7 configuration parameters from a network controller that is arranged to configure OSI Layer 2-3 configuration parameter, in accordance with at least one of the various embodiments.

FIG. 10 shows an overview flowchart for process 1000 for using plugins for configuring OSI Layer 4-7 configuration parameters from a network controller that is arranged to configure OSA Layer 2-3 configuration parameter, in accordance with at least one of the various embodiments. After a start block, at block 1002, in at least one of the various embodiments, a traffic management computer (TMC) may be arranged to generate plugins, such as plugin 512 of FIG. 5, as described above, in at least the context of block 610 of process 600 (FIG. 6) or block 714 of process 700 (FIG. 7). The TMC may be a visitor computer, such as visitor computer 404 of FIG. 4. The TMC may be generate catalog of application features, such as application features 504 of FIG. 5, which correspond to configuration parameters for various OSI Layer 4-7 network management features.

In at least one of the various embodiments, one or more templates, such as template 502 of FIG. 5, which are associated with one or more applications or services managed by the TMC may be generated and/or available for generating plugin. For example, there may be templates for different types of network applications that may be managed by the TMC. The different templates may be tailored to include application features (e.g., configuration parameters) that enable the TMC to apply rule based policies based on OSI layer 4-7 to connection flows on a network.

In at least one of the various embodiments, the configuration parameters (e.g., application features) for the TMC may be complex in order to account for the numerous kinds of applications encountered on a network and the policies that may be required to effectively manage the connection flows associated with the application. Accordingly, in at least one of the various embodiments, a plugin for configuring the OSI Layer 4-7 parameters may be generated on the TMC based on a generated template.

At block 1004, in at least one of the various embodiments, a plugin client, such as plugin client 514 of FIG. 5, may be installed on a network controller computer that is separate from the TMC. In this example, the TMC is a visitor computer and the network controller computer is the host computer.

In at least one of the various embodiments, some users may want to manage their network from a single computer, in this example, a network controller that is arranged to manage OSI Layers 2-3 settings of the network. Accordingly, the network controller is not equipped to configure the parameters necessary for applying management policies based on OSI Layers 4-7 traffic of the connection flows on the network. Thus, the network controller may be unable to establish policies to manage connection flows based on the type network application, the content of packets, enforce security policies for different applications, and so on. Further, the network controller, being limited to OSI Layers 2-3 configuration may be unable to perform application based load balancing as well. In general everything happening in the connection flows at OSI Layers 4-7 may be opaque to the network controller.

At block 1006, in at least one of the various embodiments, OSI Layers 2-3 configuration of the network may be performed at the network controller using the native facilities of the network controller. Accordingly, a user, such as, a network administrator may configure various Ethernet level parameters, such as, hardware address (MAC address) based switching rules, or at OSI Layer 3 IP based switching may be configured. However, as described above, the network administrator may be unable to configure network policy based application information (OSI Layers 4-7) associated with connection flows on the network.

At block 1008, in at least one of the various embodiments, the plugin client provided by the TMC may be used to collect OSI layer 4-7 configuration information at the network controller. In some embodiments, a network administrator may use one or more plugin clients provided by the TMC to configure OSI layer 4-7 configuration parameters for the network. The plugin client may be arranged to present a simplified user interface that exposes a minimal set of application features and/or phony entry fields that enable the operator of the network controller to configure policies that may be applied to connection flows based on OSI Layers 4-7 (e.g., the application layers).

In at least one of the various embodiments, there may be multiple plugin clients each corresponding to difference network applications that may be managed by OSI Layer 4-7 policies. For example, there may be one plugin client for configuring policies that are applied to email servers, and another for configuring policies for streaming video server. Since the network controller may be limited to OSI Layers 2-3, it may not be able to distinguish between different types of network applications, such as, email servers, streaming video servers which may require vastly different management policies. Accordingly, the network administrator may use the plugin clients generated by the TMC to provide configuration information at the network controller for use by the TMC.

In at least one of the various embodiments, as described above, the network administrator may enter configuration information into the plugin clients which in turn provide the configuration information to their corresponding plugin core on the TMC.

At block 1010, in at least one of the various embodiments, OSI layer 4-7 configuration may be performed on the TMC based on the information provided to the plugin core. As described, above, the information collected by the plugin client running on the network controller may be translated and/or mapped to configuration parameters (e.g., application features) on the TMC. In at least one of the various embodiments, this enables OSI Layer 4-7 configuration of the network to be accomplished even though the information for performing the configuration may be collected at a computer that is arranged to just configure OSI Layer 2-3.

In at least one of the various embodiments, the TMC may provide information such as OSI Layer 4-7 performance metrics via the plugin. Accordingly, a template may be configured to generate plugins that provide information to the network controller for display with the plugin client. Accordingly, the plugin core running on the TMC may collect OSI Layer 4-7 performance metrics at the TMC and provide it the plugin client running on the network controller. Thus, a network administrator may observe the OSI Layer 4-7 metrics at a computer that is limited to managing OSI Layer 2-3 features of the network. In some embodiments, the plugin may configure at least some lower-layer configuration parameters (OSI Layer 2-3). For instance, the plugin may configure OSI Layer 3 parameters such as Internet Protocol (IP) addresses, virtual local area network (VLAN) tags, and the like. Next, control may be returned to a calling process.

Illustrative Use Cases

Figure 11:
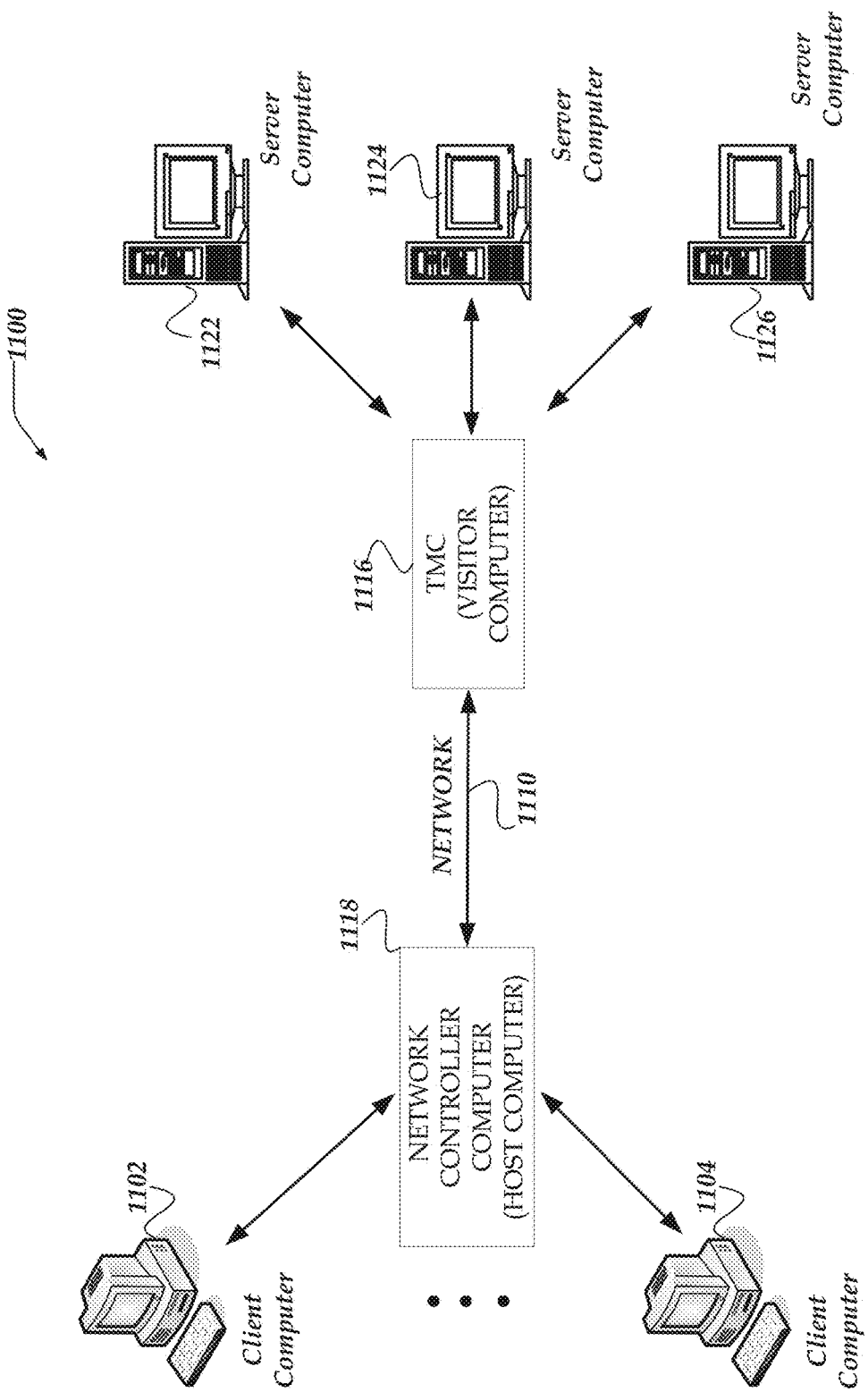
FIG. 11 shows a logical schematic of a system that uses a network controller host computer, and TMC visitor computer in accordance with at least one of the various embodiments.

FIG. 11 shows a logical schematic of system 1100 that uses a network controller host computer 1118, and traffic management computer (TMC) visitor computer 1116 in accordance with at least one of the various embodiments. In at least one of the various embodiments, client computer 1102 and client computer 1104 represent multiple client computers that may be communicating over a network. In at least one of the various embodiments, client computers 1102/1104 may be attempting to access network services/applications (e.g., streaming audio, email, streaming video, web sites, or the like) that may be provided by server computer 1122, server computer 1124, or server computer 1126, or the like.

In at least one of the various embodiments, network controller computer 1118 may be disposed between the client computers trying to access network services and the server computers 1122-1126 providing the network services. Also, TMC 1116 may be disposed between network controller computer 1118 and the server computers (server computers 1122-1126). Further, network 1110 may communicatively couple network controller computer 1118 and TMC 1116.

In at least one of the various embodiments, as described above, a network administrator may be using network controller computer 1118 to configure access to the server computers 1122-1126. However, network controller computer 1118 may be limited to applying network policies based on configuring OSI Layer 2-3 parameters. As mentioned above, this would preclude applying network policies that may be based on the network applications running on server computer 1122, server computer 1124, or server computer 1126. For example, if a server computer is an email server it may require different performance policies (quotas) and security policies than a server computer that is hosting streaming video applications.

Accordingly, the TMC 1116 may be arranged to generate one or more plugins that may enable the network administrator to configure OSI layer 4-7 using the network controller computer 1118 even though the TMC 1116 actually implements the OSI layer 4-7 policies. Accordingly, in this example, the TMC 1116 may generate a plugin for configuring email servers, streaming video server, and so on. Each plugin client for each plugin may be installed on network controller computer 1118 enabling a network administrator to perform application level (OSI layer 4-7) configuration at via network controller computer 1118.

Figure 12:
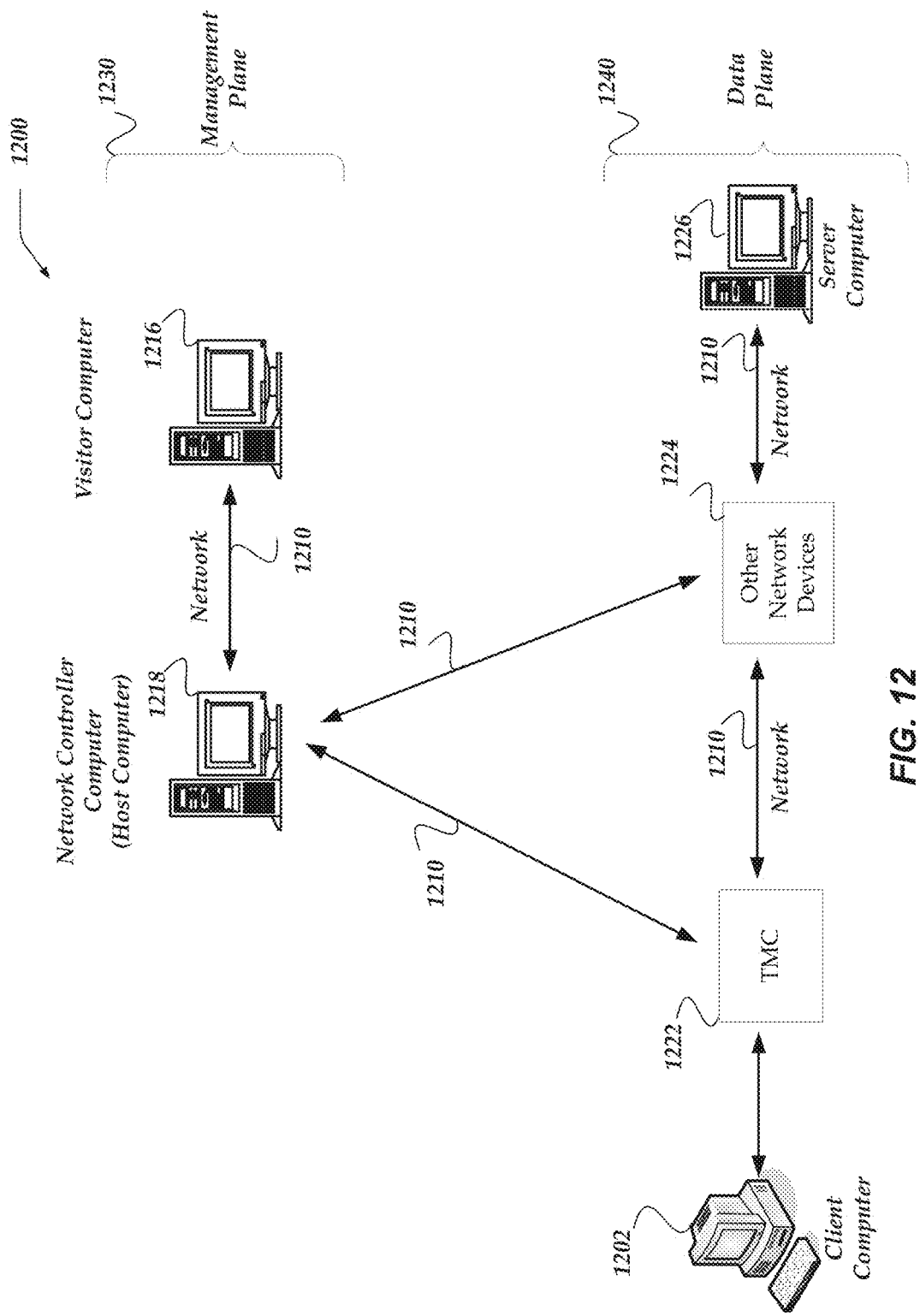
FIG. 12 shows a logical schematic of another system that is consistent with the various embodiments described herein.

FIG. 12 shows a logical schematic of another system 1200 that is consistent with the various embodiments described herein. The architecture of system 1200 is divided into a management plane 1230 and a data plane 1240. The management plane 1230 may be a network management plane. Likewise, the data plane 1240 may be a network data plane. The management plane 1230 includes a network controller computer 1218 and a visitor computer 1216. The network controller computer 1218 may be a host computer. The network controller computer 1218 may host a network controller, such as a third party network controller application. The management plane 1230 may manage the configuration of network 1210.

System 1200 includes client computer 1202, which may be similar to client computers 1102/1104 of system 1100 of FIG. 11. Client computer 1202 represents one or more client computers that may be communicating over a network. Client computer 1202 may be attempting to access network services/applications (e.g., streaming audio, email, streaming video, websites, or the like) that may be provided by server computer 1226. Server computer 1226 may be similar to any of server computers 1122-1126 of system 1100.

The network traffic between client computer 1202 and server computer 1226 may pass through the data plane 1240 of network 1210. In some embodiments, the traffic between client computer 1202 and server computer 1226 does not pass through the management plane 1230. In order to manage such traffic, the data plane 1240 includes a traffic management computer (TMC) 1222 and one or more other network devices, schematically represented as other network devices 1224. Other network devices 1224 may include routers, switches, proxies, cache devices, and the like. Server computer 1226 may additionally be included in the data plane 1240 of network 1210. Network 1210 communicatively couples network controller computer 1218, visitor computer 1216, TMC 1222, other network devices 1224, and server computer 1226.

A network administrator may be using a computer in the management plane 1230, such as network controller computer 1218 to configure access to the server computer 1226, via a network controller application hosted on network controller computer 1218. However, the network controller application may be limited to applying network policies based on configuring OSI Layer 2-3 parameters. As mentioned above, this would preclude applying network policies that may be based on the network applications running on server computer 1126, as well as at least some configuration parameters for TMC 1216 and/or at least some of the configuration parameters for other network devices 1224.

As discussed throughout, visitor computer 1216 may include a plugin generator, such as plugin generator 319 of FIG. 3, plugin generator 420 of FIG. 4, plugin generator 510 of FIG. 5, or the like. Thus, as discussed throughout, the network administrator using visitor computer 1222 may initiate the generation of one or more plugins, such as plugin 512 of FIG. 5, via the plugin generator hosted on the management computer 1222. The network administrator may access the plugin generator of visitor computer 1216, via a user interface displayed on either visitor computer 12216 or network controller computer 1218. As discussed throughout, once generated and installed, the plugin may enable the network administrator to configure OSI Layer 4-7 using the network controller application, hosted by network controller computer 1218, even though the TMC 1222 actually implements the OSI Layer 4-7 policies. In some embodiments, the plugin is enabled to configure at least some of the configuration parameters of TMC 1222. The plugin may be enabled to configure at least some of the configuration parameters of the other network devices 1224.

In this exemplary embodiment, the visitor computer 1216 generates the plugin for configuring email servers, streaming video server, and so on. Each plugin client, such as plugin client 514 of FIG. 5, for each plugin may be installed on network controller computer 1218. A corresponding plugin core, such as plugin core 516 of FIG. 5, may be installed on a plugin interface, interface, such as plugin interface 320 of FIG. 3 or visitor integration interface 416 of FIG. 4. The TMC 1222 may include one or more plugin interfaces. In at least one embodiment, the visitor computer 1216 may include one or more plugin interfaces.

Thus, the network administrator is enabled to perform application level (OSI Layer 4-7) configuration at via a network controller application hosted by the network controller computer 1218 or some other computer outside of the data plane 1240. Although as discussed in this example, the plugin generator and the network controller application are hosted by separate computers in the management plane 1230, other embodiments are not so limited. For instance, the plugin generator and the network controller application may be hosted in a single computer in the management plane 1230. In at least one embodiment, the network controller application is hosted by a computer in the management plane 1230 and the plugin generator is hosted by a computer in the data plane 1240, such as TMC 1222. Accordingly, via the plugin, a network controller computer 1218 in the management plane 1230 can configure computers in the data plane 1240, such as TMC 1222 and other network device 1224. The network controller, via the plugin, may be enabled to configure parameters at each of the OSI Layers 2-7.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for configuring a visitor computer, over a network, with a host computer, the method comprising:
    determining a plurality of application features based on a catalog of available application features of the visitor computer, wherein at least one of the application features is associated with one or more configuration parameters of visitor computer;
    generating one or more templates that list one or more of the plurality of application features;
    generating a plugin client and a corresponding plugin core that include the one or more application features listed in the one or more templates, wherein the plugin client is provided to the host computer and the corresponding plugin core is installed on the visitor computer;
    obtaining information from the host computer that is associated with one or more actions performed by one or more users of the plugin client; and
    when the obtained information is provided to the corresponding plugin core, performing further actions:
        determining one or more of the one or more application features included in the plugin core based on the information obtained from the host computer; and
        performing operations on the visitor computer based on the obtained information and the determined one or more application features that are included in the plugin core, wherein the performed operations include configuring one or more of the one or more configuration parameters of the visitor computer based on at least a portion of the obtained information.

2. The method of claim 1, wherein generating the one or more templates, further comprises, determining one or more of default values, constraint values, permission levels, or tags, for one or more of the one or more application features that are listed in the one or more templates.

3. The method of claim 1, wherein one or more of the plurality application features perform configuration of the one or more configuration parameters, wherein the one or more configuration parameters are associated with Open System Interconnect model (OSI) layers 4-7.

4. The method of claim 1, wherein generating the one or more templates, further comprises, determining one or more custom features that are listed in the one or more templates, wherein the one or more customer features comprise one or more of, a script, a program, or an interface to an external service.

5. The method of claim 1, wherein generating the one or more templates, further comprises, determining feature group information that associates one or more of the one or more listed application features, wherein the feature group information includes dependencies information related to the associated one or more of the one or more listed application features.

6. The method of claim 1, wherein the one or more application features that are listed in the one or more templates are selected based on one or more applications of the visitor computer.

7. The method of claim 1, further comprising employing a processor readable non-transitory storage media to include instructions for configuring the visitor computer, over the network, with the host computer, wherein the execution of the instructions by a processor performs the method's actions.

8. A host computer for configuring a visitor computer, over a network, comprising:
    a memory for storing at least instructions; and
    a processor device that executes the instructions to enable actions, including:
        determining a plurality of application features based on a catalog of available application features of the visitor computer, wherein at least one of the application features is associated with one or more configuration parameters of visitor computer;
        generating one or more templates that list one or more of the plurality of application features;
        generating a plugin client and a corresponding plugin core that include the one or more application features listed in the one or more templates, wherein the plugin client is provided to the host computer and the corresponding plugin core is installed on the visitor computer;
        obtaining information from the host computer that is associated with one or more actions performed by one or more users of the plugin client; and
        when the obtained information is provided to the corresponding plugin core, performing further actions:

determining one or more of the one or more application features included in the plugin core based on the information obtained from the host computer; and performing operations on the visitor computer based on the obtained information and the determined one or more application features that are included in the plugin core, wherein the performed operations include configuring one or more of the one or more configuration parameters of the visitor computer based on at least a portion of the obtained information.

9. The host computer of claim 8, wherein generating the one or more templates, further comprises, determining one or more of default values, constraint values, permission levels, or tags, for one or more of the one or more application features that are listed in the one or more templates.

10. The host computer of claim 8, wherein one or more of the plurality application features perform configuration of the one or more configuration parameters, wherein the one or more configuration parameters are associated with Open System Interconnect model (OSI) layers 4-7.

11. The host computer of claim 8, wherein generating the one or more templates, further comprises, determining one or more custom features that are listed in the one or more templates, wherein the one or more customer features comprise one or more of, a script, a program, or an interface to an external service.

12. The host computer of claim 8, wherein generating the one or more templates, further comprises, determining feature group information that associates one or more of the one or more listed application features, wherein the feature group information includes dependencies information related to the associated one or more of the one or more listed application features.

13. The host computer of claim 8, wherein the one or more application features that are listed in the one or more templates are selected based on one or more applications of the visitor computer.

14. A system for configuring a visitor computer, over a network, comprising:
a host computer that includes;
  a memory for storing at least instructions; and
  a processor device that executes the instructions to enable actions, including:
    determining a plurality of application features based on a catalog of available application features of the visitor computer, wherein at least one of the application features is associated with one or more configuration parameters of visitor computer;
    generating one or more templates that list one or more of the plurality of application features;
    generating a plugin client and a corresponding plugin core that include the one or more application features listed in the one or more templates, wherein the plugin client is provided to the host computer and the corresponding plugin core is installed on the visitor computer;
    obtaining information from the host computer that is associated with one or more actions performed by one or more users of the plugin client; and
    when the obtained information is provided to the corresponding plugin core, performing further actions:
      determining one or more of the one or more application features included in the plugin core based on the information obtained from the host computer; and
      performing operations on the visitor computer based on the obtained information and the determined one or more application features that are included in the plugin core, wherein the performed operations include configuring one or more of the one or more configuration parameters of the visitor computer based on at least a portion of the obtained information.

15. The system of claim 14, wherein generating the one or more templates, further comprises, determining one or more of default values, constraint values, permission levels, or tags, for one or more of the one or more application features that are listed in the one or more templates.

16. The system of claim 14, wherein one or more of the plurality application features perform configuration of the one or more configuration parameters, wherein the one or more configuration parameters are associated with Open System Interconnect model (OSI) layers 4-7.

17. The system of claim 14, wherein generating the one or more templates, further comprises, determining one or more custom features that are listed in the one or more templates, wherein the one or more customer features comprise one or more of, a script, a program, or an interface to an external service.

18. The system of claim 14, wherein generating the one or more templates, further comprises, determining feature group information that associates one or more of the one or more listed application features, wherein the feature group information includes dependencies information related to the associated one or more of the one or more listed application features.

19. The system of claim 14, wherein the one or more application features that are listed in the one or more templates are selected based on one or more applications of the visitor computer.

* * * * *

UNITED STATES PATENT AND TRADEMARK OFFICE
CERTIFICATE OF CORRECTION

PATENT NO. : 9,880,814 B1  
APPLICATION NO. : 15/236300  
DATED : January 30, 2018  
INVENTOR(S) : Fisher et al.

It is certified that error appears in the above-identified patent and that said Letters Patent is hereby corrected as shown below:

In the Specification

In Column 1, Line 8, delete "Application U.S." and insert -- Application --, therefor.

In Column 2, Line 15, delete "determining" and insert -- determine --, therefor.

In Column 3, Line 26, delete "flow,", "flow"" and insert -- flow," "flow" --, therefor.

In Column 7, Line 59, delete "4th (4G)" and insert -- 4th (4G), --, therefor.

In Column 7, Line 67, delete "Mobil" and insert -- Mobile --, therefor.

In Column 8, Line 2, delete "Enhanced Data GSM Environment" and insert -- Enhanced data rates for GSM evolution --, therefor.

In Column 15, Line 31, delete "web site" and insert -- website --, therefor.

In Column 15, Line 61, delete "visitor computer 402." and insert -- visitor computer 404. --, therefor.

In Column 15, Line 62, delete "visitor computer 402" and insert -- visitor computer 404 --, therefor.

In Column 15, Line 65, delete "visitor computer 402" and insert -- visitor computer 404 --, therefor.

In Columns 15 & 16, Lines 67 & 1, delete "visitor computer 402" and insert -- visitor computer 404 --, therefor.

In Column 16, Line 3, delete "visitor computer 402" and insert -- visitor computer 404 --, therefor.

In Column 16, Line 7, delete "visitor computer 402" and insert -- visitor computer 404 --, therefor.

Signed and Sealed this  
Twelfth Day of May, 2020

Andrei Iancu  
*Director of the United States Patent and Trademark Office*

CERTIFICATE OF CORRECTION (continued)

U.S. Pat. No. 9,880,814 B1

In Column 16, Lines 8-9, delete "visitor computer 402" and insert -- visitor computer 404 --, therefor.

In Column 16, Line 13, delete "host computer 404." and insert -- host computer 402. --, therefor.

In Column 16, Line 14, delete "host computer 404" and insert -- host computer 402 --, therefor.

In Column 16, Lines 17-32, delete "FIG. 3. In at least one of the various embodiments, host computer 404 may be a component of a network edge device, such as, a router, network controller, or the like. Further, in at least one of the various embodiments, host computer 404 may represent one or more virtual machines and/or is operative in a cloud based environment. In some embodiments, host computer 404 may include a specialized hardware component, a specialized software component, or a combination thereof included or implemented in an device, or in any other network computer device. Accordingly, the host computer 404 may be a hardware and/or software module. In various embodiments, host computer 404 may be operative to execute a configuration management system or a network controller. Visitor computer 402 and host computer 404 may be communicatively coupled via a communication network, such as network 110 of FIG. 1." and insert the same at Line 16 after "300 of" as a continuation paragraph.

In Column 16, Lines 17-18, delete "host computer 404" and insert -- host computer 402 --, therefor.

In Column 16, Lines 20-21, delete "host computer 404" and insert -- host computer 402 --, therefor.

In Column 16, Line 23, delete "host computer 404" and insert -- host computer 402 --, therefor.

In Column 16, Line 25, delete "an device," and insert -- a device, --, therefor.

In Column 16, Line 27, delete "host computer 404" and insert -- host computer 402 --, therefor.

In Column 16, Line 28, delete "host computer 404" and insert -- host computer 402 --, therefor.

In Column 16, Lines 30-31, delete "Visitor computer 402 and host computer 404" and insert -- Visitor computer 404 and host computer 402 --, therefor.

In Column 22, Line 34, delete "tags" and insert -- tags. --, therefor.

In Column 22, Line 49, delete "determining" and insert -- determine --, therefor.

In Column 23, Line 28, delete "may be have" and insert -- may have --, therefor

In Column 27, Line 4, delete "web sites," and insert -- websites, --, therefor.

In Column 28, Line 20, delete "TMC 1216" and insert -- TMC 1222 --, therefor.

In Column 28, Line 26, delete "visitor computer 1222" and insert -- visitor computer 1216 --, therefor.

In Column 28, Lines 31-32, delete "visitor computer 12216" and insert -- visitor computer 1216 --, therefor.